United States Patent
Nakano et al.

(10) Patent No.: US 9,427,777 B2
(45) Date of Patent: Aug. 30, 2016

(54) PROCESS FOR PRODUCING CHARGE RETENTION MEDIUM

(71) Applicant: Asahi Glass Company, Limited, Tokyo (JP)

(72) Inventors: Takashi Nakano, Tokyo (JP); Kuniko Okano, Tokyo (JP); Naoko Shirota, Tokyo (JP); Kimiaki Kashiwagi, Tokyo (JP); Yoshitomi Morizawa, Tokyo (JP); Yoshiki Hamatani, Tokyo (JP)

(73) Assignee: ASAHI GLASS COMPANY, LIMITED, Tokyo (JP)

( * ) Notice: Subject to any disclaimer, the term of this patent is extended or adjusted under 35 U.S.C. 154(b) by 17 days.

(21) Appl. No.: 13/831,183

(22) Filed: Mar. 14, 2013

(65) Prior Publication Data

US 2013/0202810 A1 Aug. 8, 2013

Related U.S. Application Data

(63) Continuation of application No. PCT/JP2011/077986, filed on Dec. 12, 2011.

(30) Foreign Application Priority Data

Dec. 3, 2010 (JP) ................................. 2010-270651

(51) Int. Cl.
*B05D 3/00* (2006.01)
*B29C 71/02* (2006.01)
(Continued)

(52) U.S. Cl.
CPC ............. *B05D 5/12* (2013.01); *C08F 214/265* (2013.01); *C09D 127/18* (2013.01); *H01G 7/021* (2013.01); *H01G 7/023* (2013.01); *H02N 1/00* (2013.01); *C08K 5/03* (2013.01); *C08K 5/07* (2013.01)

(58) Field of Classification Search
CPC ........ H01G 7/02; H01G 7/021; H01G 7/023; H01G 7/028; B05D 5/12
See application file for complete search history.

(56) References Cited

U.S. PATENT DOCUMENTS

2011/0012438 A1* 1/2011 Kashiwagi et al. .......... 307/400
2011/0172336 A1* 7/2011 Nakano et al. ................ 524/99
(Continued)

FOREIGN PATENT DOCUMENTS

EP 0 936 081 A1 8/1999
FR 921695 5/1947
(Continued)

OTHER PUBLICATIONS

International Preliminary Report on Patentability PCT/JP2011/077986 dated Jun. 4, 2013.
(Continued)

*Primary Examiner* — Michael Wieczorek
(74) *Attorney, Agent, or Firm* — Foley & Lardner LLP

(57) ABSTRACT

To provide a process for producing a charge retention medium, with which a coating film (precursor of a charge retention medium) containing a fluorinated copolymer having repeating units based on tetrafluoroethylene and repeating units based on ethylene can easily be formed on the surface of a substrate, even in a case where the surface of the substrate has a complicated shape.
A process for producing a charge retention medium (electret 30), which comprises a step of applying a coating composition containing a fluorinated copolymer (A) having repeating units based on tetrafluoroethylene and repeating units based on ethylene, and an organic solvent (C), to a substrate (first substrate 10) to form a coating film.

20 Claims, 2 Drawing Sheets

(51) Int. Cl.
  *B29C 71/04*   (2006.01)
  *B05D 5/12*    (2006.01)
  *C08F 214/26*  (2006.01)
  *H01G 7/02*    (2006.01)
  *C09D 127/18*  (2006.01)
  *H02N 1/00*    (2006.01)
  *C08K 5/03*    (2006.01)
  *C08K 5/07*    (2006.01)

(56) References Cited

U.S. PATENT DOCUMENTS

2011/0263785 A1    10/2011  Kashiwagi
2013/0017334 A1*   1/2013   Nakano et al. ............ 427/385.5

FOREIGN PATENT DOCUMENTS

| JP | 6-332198 A | 12/1994 |
| JP | 2001-151970 A | 6/2001 |
| JP | 2004-128361 A | 4/2004 |
| JP | 2007-199639 A | 8/2007 |
| JP | 2009-012474 A | 1/2009 |
| JP | 4456803 B2 | 2/2010 |
| JP | 2010-182862 A | 8/2010 |
| WO | WO 2009119678 A1 * | 10/2009 |
| WO | WO 2010/032759 A1 | 3/2010 |
| WO | WO 2010/044421 A1 | 4/2010 |
| WO | WO 2010/044425 A1 | 4/2010 |
| WO | WO 2010044421 A1 * | 4/2010 |
| WO | WO-2010/095553 A1 | 8/2010 |
| WO | WO 2010/095554 A1 | 8/2010 |
| WO | WO 2011129032 A1 * | 10/2011 |

OTHER PUBLICATIONS

International Search Report PCT/JP2011/077986 filed Mar. 19, 2012.
Supplementary Partial European Search Report dated Aug. 25, 2015 issued in EP11844927.

* cited by examiner

PROCESS FOR PRODUCING CHARGE RETENTION MEDIUM

TECHNICAL FIELD

The present invention relates to a process for producing a charge retention medium such as an electret.

BACKGROUND ART

A charge retention medium is an insulator (dielectric) which maintains a certain capacity of charge on its surface or in its interior. The charge retention medium is classified into two types, i.e. one which maintains homocharge (independent charge) in its interior by injecting electric charge to an insulator (dielectric), and one such that an insulator (dielectric) itself is polarized to maintain a certain capacity of charge as the entire material.

As the charge retention medium which maintains homocharge, a material having high insulation properties and a low water-absorbing property is used. Specifically, such a material may be one having positive or negative charge injected by a method such as corona discharge to a hydrocarbon organic polymer material such as polypropylene, polystyrene or a cycloolefin copolymer; a fluorinated polymer material such as polytetrafluoroethylene (PTFE) or a tetrafluoroethylene/hexafluoropropylene copolymer (FEP); an inorganic insulating material formed by thermal oxidation or plasma CVD, such as $SiO_2$; or the like. The charge retention medium having the homocharge maintained is applicable, utilizing the potential appearing on its surface, to an electrostatic induction conversion device (such as a power generation device, a microphone or a speaker) or to a filter having an increased dust collection efficiency. Further, it is also applicable to a piezoelectric device or an actuator since it has opposite polarity as between on the front surface and on the rear surface and thus it has a property as if it is polarized as the entire medium.

As the charge retention medium such that the insulator (dielectric) itself is polarized, a material having a high anisotropy (large dipole moment) in its molecule is used. A material having a ferroelectric property is mainly used, and specifically, an anisotropic organic polymer material such as polyvinylidene fluoride or a liquid crystalline polymer; an anisotropic inorganic material such as PZT ($Pb(Zr,Ti)O_3$); or the like may be mentioned. The charge retention medium of a type such that the insulator (dielectric) itself is polarized is applicable to a recording medium such as a memory utilizing its strong dielectric property, a piezoelectric device or an actuator utilizing the polarization of the entire medium, or the like.

Such a charge retention medium is used, specifically, for the following applications.

The applications of one which maintains the homocharge may, for example, be an electret to be used for an electrostatic induction conversion device (such as a power generation device, a microphone, a speaker, an actuator or a sensor) which converts an electric energy and a kinetic energy; an electrostatic charge retention layer in an electrostatic charge recording medium having an electrostatic charge retention layer in an electrode layer (Patent Document 1); a surface member of a cleaning roller which cleans away a toner remaining on the surface of a photoreceptor in an image forming apparatus (such as a copying machine or a printer) (Patent Document 2); a member for particles for image display having a color and an electrostatic property to be used for an image display device such as electronic paper (Patent Document 3); a piezoelectric electret film which, in a printing machine in which an inking roller is pressed against a printing plate, measures the pressing of the inking roller against the printing plate (Patent Document 4); and a dust collection filter.

The applications of one such that an insulator (dielectric) itself is polarized may, for example, be an electrostatic charge retention layer in an electrostatic charge recording medium having an electrostatic charge retention layer on an electrode layer (Patent Document 1); a surface member of a cleaning roller which cleans away a toner remaining on the surface of a photoreceptor in an image forming apparatus (such as a copying machine or a printer) (Patent Document 2); and a piezoelectric electret film which, in a printing machine in which an inking roller is pressed against a printing plate, measures the pressing of the inking roller against the printing plate (Patent Document 4).

Particularly, an electrostatic induction conversion device (such as a power generation device or a microphone) having an electret as the charge retention medium provided on the surface of a substrate attracts attention. As the electret, for example, Patent Document 5 proposes an electret having electric charge injected to a precursor (a coating film or a film) of an electret obtainable from a composition containing a compound (A) having a molecular weight of from 50 to 2,000 having at least two polar functional groups and a polymer (B) having a number average molecular weight exceeding 2,000, having reactive functional groups reactive with the polar functional groups. Further, Patent Document 5 discloses, as the polymer (B), a fluorinated polymer (e.g. a fluorinated polymer having a cyclic structure in its main chain, or a fluorinated copolymer (hereinafter sometimes referred to as ETFE) having repeating units based on ethylene and repeating units based on tetrafluoroethylene).

As the material for the charge retention medium, in the case of using a fluorinated polymer, ETFE may sometimes be used in view of the following points.

Since ETFE is inexpensive as compared with a fluorinated polymer having a cyclic structure in its main chain, the charge retention medium can be obtained at a low Cost.

Since ETFE has crystallinity, dispersion at the nano-order level is possible by introducing an additive to the charge retention medium so that it is incorporated in the amorphous portion between crystals.

Since ETFE has crystallinity, it is less likely to be softened even at the glass transition point or higher.

Further, Patent Documents 6 and 7 disclose that ETFE is soluble in a specific organic solvent (a fluorinated aromatic compound or a linear hydrocarbon compound having a carbonyl group) under heating at a temperature of at most the melting point of ETFE, and Patent Document 6 discloses that when an ETFE solution having ETFE dissolved in a fluorinated aromatic compound is cooled, an ETFE dispersion is obtained.

PRIOR ART DOCUMENTS

Patent Documents

Patent Document 1: JP-A-6-332198
Patent Document 2: JP-A-2007-199639
Patent Document 3: Japanese Patent No. 4456803
Patent Document 4: JP-A-2009-012474
Patent Document 5: WO2010/032759
Patent Document 6: WO2010/044421
Patent Document 7: WO2010/044425

DISCLOSURE OF INVENTION

Technical Problem

Since ETFE is insoluble in an organic solvent except for a case where a special organic solvent is used under special conditions, a coating film cannot be formed on the surface of a substrate by application of a solution containing ETFE. A method of forming a coating film or a film to be a precursor of an electret by using ETFE is limited to a method of heat-melting ETFE to form a coating film or a film, such as a method of forming pellets containing ETFE into a film by various forming methods (e.g. extrusion molding or injection molding), or a method of baking a powder coating containing ETFE to the surface of a substrate to form a coating film. However, in a case where the surface of a substrate has a complicated shape (such as convexoconcave of an electrode or a pattern of an electrode), if a coating film is formed on the surface of the substrate by a method other than the method of applying a solution, or if a film is bonded to the surface of the substrate, the coating film or the film cannot conform to the complicated shape, and production of e.g. an electrostatic induction conversion device is difficult in some cases.

Patent Document 6 discloses an ETFE dispersion, but failed to disclose that a coating film to be a precursor of a charge retention medium can be formed by using the ETFE dispersion, and of course, failed to disclose that an electret having a high charge density and a sufficient surface potential is obtainable by injecting electric current to a coating film formed by using the ETFE dispersion.

The present invention provides a process for producing a charge retention medium, by which a coating film (a precursor of a charge retention medium) containing a fluorinated copolymer having repeating units based on ethylene and repeating units based on tetrafluoroethylene can easily be formed on the surface of a substrate, even when the surface of the substrate has a complicated shape.

Solution to Problem

The present invention provides the following [1] to [11].

[1] A process for producing a charge retention medium, which comprises a step of applying a coating composition containing a fluorinated copolymer (A) having repeating units based on tetrafluoroethylene and repeating units based on ethylene, and an organic solvent (C), to a substrate to form a coating film.

[2] The process for producing a charge retention medium according to [1], which comprises the following steps (I), (II), (IV) and (V) in this order:
(I) a step of dissolving the fluorinated copolymer (A) in the organic solvent (C) at a temperature of at least the dissolution temperature at which the fluorinated copolymer (A) is dissolved in the organic solvent (C) and at most the melting point of the fluorinated copolymer (A) to obtain a fluorinated copolymer solution;
(II) a step of cooling the fluorinated copolymer solution to a temperature of less than the dissolution temperature to obtain a coating composition having microparticles of the fluorinated copolymer (A) dispersed in the organic solvent (C);
(IV) a step of applying the coating composition to the substrate to form a wet film; and
(V) a step of preliminarily drying the wet film at a temperature of at least 50° C. and less than 150° C., followed by baking at from 160 to 350° C. to form a coating film.

[3] The process for producing a charge retention medium according to [2], which comprises, after the step (V), a step (VII) of injecting electric charge into the coating film to obtain a charge retention medium.

[4] The process for producing a charge retention medium according to any one of [1] to [3], wherein the fluorinated copolymer (A) is a fluorinated copolymer having reactive functional groups.

[5] The process for producing a charge retention medium according to [4], wherein the fluorinated copolymer (A) has repeating units based on a monomer having a reactive functional group, and the proportion of the repeating units is from 0.01 to 5 mol % based on all the repeating units (100 mol %).

[6] The process for producing a charge retention medium according to [4] or [5], wherein the reactive functional groups of the fluorinated copolymer (A) are at least one member selected from the group consisting of carboxylic acid groups, acid anhydride groups and carboxylic acid halide groups.

[7] The process for producing a charge retention medium according to any one of [1] to [6], wherein the proportion of the fluorinated copolymer (A) is from 0.1 to 30 mass % based on the coating composition (100 mass %).

[8] The process for producing a charge retention medium according to any one of [1] to [7], wherein the organic solvent (C) is an organic solvent of which the dissolution index (R) represented by the following formula (1) is less than 49:

$$R=4\times(\delta d-15.7)^2+(\delta p-5.7)^2+(\delta h-4.3)^2 \quad (1)$$

wherein δd, δp and δh respectively represent the dispersion component, the polar component and the hydrogen bonding component [$(MPa)^{1/2}$], in Hansen solubility parameters of organic solvents.

[9] The process for producing a charge retention medium according to any one of [1] to [8], wherein the coating composition contains at least one charge aid (B) selected from the group consisting of a compound having a least one amino group and at least one reactive functional group (excluding an amino group) and a compound having at least two amino groups and having no reactive functional group (excluding an amino group).

[10] The process for producing a charge retention medium according to [9], wherein the amount of use of the charge aid (B) is from 0.1 to 10 parts by mass based on 100 parts by mass of the fluorinated copolymer (A).

[11] The process for producing a charge retention medium according to any one of [1] to [10], wherein the charge retention medium is an electret.

Advantageous Effects of Invention

According to the process for producing a charge retention medium of the present invention, a coating film (a precursor of a charge retention medium) containing a fluorinated copolymer having repeating units based on ethylene and repeating units based on tetrafluoroethylene can easily be formed on the surface of a substrate, even when the surface of the substrate has a complicated shape.

DESCRIPTION OF EMBODIMENTS

In this specification, "repeating units" means units derived from a monomer, formed by polymerization of the monomer. The repeating units may be units directly formed by a polymerization reaction, or may be units having some of the units converted to another structure by treating the polymer.

In this specification, "monomer" means a compound having a polymerizable carbon-carbon double bond.

In this specification, "solution state" in which a fluorinated copolymer is dissolved in an organic solvent means a uniform state with no insoluble matters confirmed, when a mixture having the fluorinated copolymer and the organic solvent sufficiently mixed is visually observed.

In this specification, "dissolution temperature" is a temperature measured by the following method.

0.10 g of a fluorinated copolymer is added to 4.90 g of an organic solvent to form a mixture, the mixture is heated while a sufficiently mixed state is always maintained e.g. by a stirring means, and whether the fluorinated copolymer is dissolved or not is visually observed. First, the temperature at which the mixture is confirmed to be in a uniform solution state and completely dissolved, is confirmed. Then, the mixture is gradually cooled and the temperature at which the solution becomes clouded is confirmed, and the mixture is further heated again, and the temperature at which the solution is again in a uniform solution state is regarded as the dissolution temperature.

<Charge Retention Medium>

The charge retention medium of the present invention is obtainable by the after-mentioned production process of the present invention, i.e. a process of applying a coating composition containing a fluorinated copolymer (A) and an organic solvent (C) and as the case requires, a charge aid (B), to a substrate to form a coating film.

Figure 1:
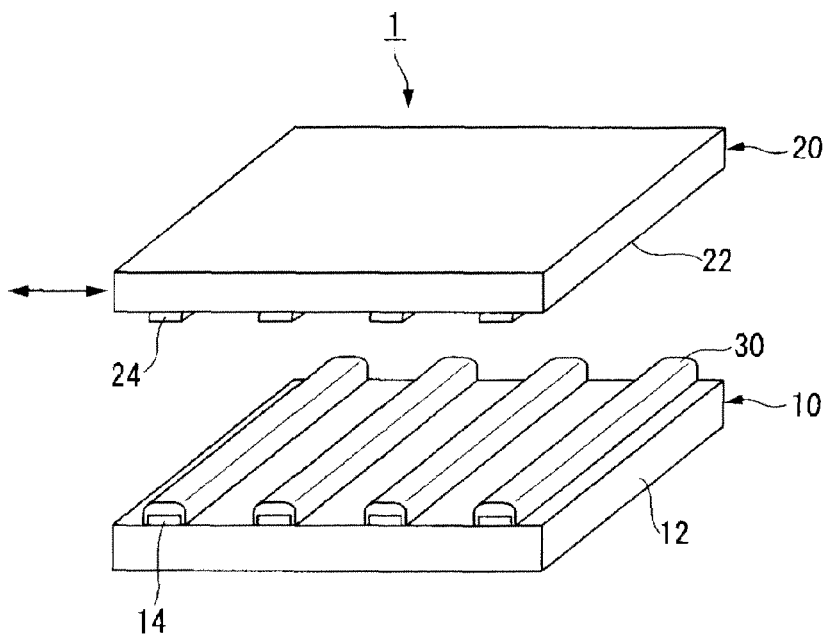
FIG. 1 is an oblique view illustrating one example of an electrostatic induction power generation device using a charge retention medium.

FIG. 1 is an oblique view illustrating one example of an electrostatic induction power generation device, as one example of an electrostatic induction conversion device using the charge retention medium as an electret.

An electrostatic induction power generation device 1 comprises a substrate main body 12 made of an insulating material, and on the surface of the substrate main body, a first substrate 10 having a plurality of linear base electrodes 14 formed with certain intervals so that their longitudinal direction is at right angles to a direction (direction of the arrow in the drawing) in which the following second substrate 20 moves; a second substrate 20 disposed substantially in parallel with a certain distance from the first substrate 10 so that it can reciprocate (vibrate) in a direction of the arrow in the drawing, having a plurality of linear counter electrodes 24 formed with certain intervals on the surface on the first substrate 10 side of a substrate main body 22 made of an insulating material so that their longitudinal direction is at right angles to a direction (direction of the arrow in the drawing) in which the second substrate 20 moves; an electret 30 having electric charge injected to a coating film formed into a pattern corresponding to the base electrodes 14, covering the base electrodes 14 on the surface of the first substrate 10; and a wiring (not shown in the drawing) which electrically connects the base electrodes 14 and the counter electrodes 24, in the middle of which a load (not shown in the drawing) is applied.

By the electrostatic induction power generation device 1, electricity can be generated by reciprocating (vibrating) the second substrate 20 in the direction of the arrow in the drawing substantially horizontally. That is, by this vibration, the position of the second substrate 20 to the first substrate 10 relatively changes, whereby the overlapping area of the electret 30 having electric charge injected to the coating film and the counter electrodes 24 at facing positions changes. At the overlapping portion of the electret 30 and the counter electrodes 24, the counter electrodes 24 acquire a charge of opposite polarity to a charge in the electret 30 by the charge in the electret 30, by electrostatic induction. Whereas, at a portion where the electret 30 and the counter electrodes 24 are not overlapped, there is no opposite charge which opposes the preliminarily induced charge, and to cancel the difference in potential with an external load (not shown in the drawing), an electric current flows to the load. An electric energy is generated by isolating this repetition as waves of the voltage. In such a manner, the kinetic energy is converted to the electric energy.

[Fluorinated Copolymer (A)]

The fluorinated copolymer (A) is a copolymer having repeating units based on tetrafluoroethylene (hereinafter sometimes referred to as TFE) and repeating units based on ethylene.

The molar ratio (TFE/ethylene) of the repeating units based on TFE to the repeating units based on ethylene is preferably from 70/30 to 30/70, more preferably from 65/35 to 40/60, particularly preferably from 60/40 to 40/60. When the molar ratio is within the above range, a favorable balance between characteristics derived from the repeating units based on TFE, such as the heat resistance, the weather resistance and the chemical resistance, and characteristics derived from the repeating units based on ethylene, such as the mechanical strength and the forming properties, will be obtained.

The fluorinated copolymer (A) preferably has repeating units based on a monomer other than TFE or ethylene (hereinafter referred to as other monomer) with a view to imparting various functions to the obtainable copolymer. Such other monomer may, for example, be other monomers disclosed in paragraphs [0025] to [0026] of Patent Document 6 and paragraphs [0026] to [0027] of Patent Document 7. For example, such other monomers may be vinylidene fluoride ($CF_2=CH_2$), hexafluoropropylene ($CF_2=CFCF_3$), 3,3,4,4,4-pentafluoro-1-butene ($CF_3CF_2CH=CH_2$), 3,3,4,4,5,5,6,6,6-nonafluoro-1-hexene ($CF_3CF_2CF_2CF_2CH=CH_2$), 2,3,3,4,4,5,5-heptafluoro-1-pentene ($CF_2HCF_2CF_2CF=CH_2$), propylene, isobutylene, 4-methyl-1-pentene, vinyl chloride or vinylidene chloride.

The fluorinated copolymer (A) preferably has reactive functional groups having reactivity with the substrate or the charge aid (B) in view of the adhesion of the coating film to the substrate and the affinity (or bonding property) to the charge aid (B). The reactive functional groups may be present at any of the molecular terminal, the side chain or the main chain of the fluorinated copolymer (A). Further, only one type of the reactive functional groups may be present, or two or more types thereof may be present. The type and the content of the reactive functional groups are properly selected depending upon the type of the substrate and the charge aid (B), functional groups which the substrate and the charge aid (B) have, the application of the charge retention medium, characteristics required for the charge retention medium, the method how the reactive functional groups are introduced to the fluorinated copolymer (A), and the like.

The reactive functional groups may be at least one member selected from the group consisting of carboxylic acid groups, groups formed by dehydration condensation of two carboxy groups in one molecule (hereinafter referred to as acid anhydride groups), hydroxy groups, sulfonic acid groups, epoxy groups, cyano groups, carbonate groups, isocyanate groups, ester groups, amide groups, aldehyde groups, amino groups, hydrolyzable silyl groups, carbon-carbon double bonds, alkoxy groups and carboxylic acid halide groups.

The carboxylic acid group means a carboxy group and its salt (—COOM$^1$). Here, M$^1$ is a metal atom or an atomic group capable of forming a salt with a carboxylic acid.

The sulfonic acid group means a sulfo group and its salt (—SO$_3$M$^2$). Here, M$^2$ is a metal atom or an atomic group capable of forming a salt with a sulfonic acid.

The hydrolyzable silyl group is a group having an alkoxy group, an amino group, a halogen atom or the like bonded to the silicon atom, and is a group capable of being cross-linked by forming a siloxane bond by hydrolysis. It is preferably a trialkoxysilyl group, an alkyldialkoxysilyl group or the like.

Among the reactive functional groups, preferred is at least one member selected from the group consisting of carboxylic acid groups, acid anhydride groups, hydroxy groups, epoxy groups, carbonate groups, amino groups, amide groups, hydrolyzable silyl groups, carbon-carbon double bonds and carboxylic acid halide groups, and in view of the reactivity with the amino group of the charge aid (B), more preferred is at least one member selected from the group consisting of carboxylic acid groups, acid anhydride groups and carboxylic acid halide groups. By reaction of the reactive functional groups (carboxylic acid groups, acid anhydride groups or carboxylic acid halide groups) of the fluorinated copolymer (A) and the amino group of the charge aid (B), and thus formation of an imide bond or an amide bond of the fluorinated copolymer (A) and the charge aid (B), the charge aid (B) is dispersed at the nano-order level in the fluorinated copolymer (A). Since the charge aid (B) plays a role of a charge retention portion, the more the charge aid (B) is dispersed in the fluorinated copolymer (A) in units as small as possible, the more the performance of the obtainable charge retention medium will be improved.

As a method of introducing the reactive functional groups to the fluorinated copolymer (A), the following methods may, for example, be mentioned.

(i) A method of copolymerizing a monomer having a reactive functional group as one of other monomers when TFE, ethylene and other monomer are polymerized.

(ii) A method of introducing reactive functional groups to the molecular terminals of the fluorinated copolymer (A) by using a polymerization initiator, a chain transfer agent or the like having a reactive functional group when TFE and ethylene and as the case requires, other monomer are copolymerized.

(iii) A method of grafting to the fluorinated copolymer (A) a compound (compound to be grafted) having a reactive functional group and a functional group (such as an unsaturated bond) capable of being grafted.

Two or more of the methods (i) to (iii) may properly be combined. Among the methods (i) to (iii), preferred is the method (i) and/or (ii) in view of the durability of the fluorinated copolymer (A).

Further, in addition to the reactive functional groups, functional groups to be introduced as the case requires to impart various functions to the fluorinated copolymer (A), can also be introduced to the fluorinated copolymer (A) by the same method as the method of introducing the reactive functional groups.

In the case of introducing the reactive functional groups to the fluorinated copolymer (A) by the method (i), the proportion f the repeating units based on the monomer having a reactive functional group in the fluorinated copolymer (A) is preferably from 0.01 to 5 mol %, particularly preferably from 0.05 to 3 mol % of all the repeating units (100 mol %). When the proportion of the repeating units based on the monomer having the reactive functional group is within such a range, a sufficient reactivity with the substrate or the charge aid (B) can be imparted, without impairing characteristics of ETFE consisting substantially solely of repeating units based on TFE and repeating units based on ethylene.

The melting point of the fluorinated copolymer (A) is preferably from 130° C. to 275° C., more preferably from 140° C. to 265° C., particularly preferably from 150° C. to 260° C., in view of the solubility, the strength or the like. The melting point of the fluorinated copolymer (A) may be measured, for example, by a differential scanning calorimetry (DSC) apparatus.

The volume flow rate (hereinafter referred to as Q value) of the fluorinated copolymer (A) is preferably from 0.1 to 2,000 mm$^3$/sec. The Q value is an index representing the melt fluidity of the fluorinated copolymer (A) and an indicator of the molecular weight. When the Q value is high, the molecular weight is low, and the value is low, the molecular weight is high. The Q value is an extrusion velocity when the fluorinated copolymer (A) is extruded into an orifice having a diameter of 2.1 mm and a length of 8 mm under a load of 7 kgf at a temperature higher by 50° C. than the melting point of the fluorinated copolymer (A) by using a flow tester (manufactured by Shimadzu Corporation). If the Q value is too low, the solubility tends to be poor, and if it is too high, the mechanical strength of the fluorinated copolymer tends to be low, and when such a copolymer is formed into a coating film, cracks or the like are likely to occur. The Q value of the fluorinated copolymer (A) is more preferably from 5 to 500 mm$^3$/sec, particularly preferably from 10 to 200 mm$^3$/sec. When the Q value is within the above range, the fluorinated copolymer (A) will be excellent in the mechanical strength, and when used for a coating composition, cracks or the like will not form on the coating film, and such a coating composition is excellent in the coating properties.

As the fluorinated copolymer (A), commercially available ETFE may be used. Commercially available ETFE may be ones disclosed in paragraph [0028] of Patent Document 6 and paragraph [0031] of Patent Document 7. For example, Fluon (registered trademark) ETFE Series, Fluon LM-ETFE AH Series, manufactured by Asahi Glass Company, Limited, and the like may be mentioned.

The fluorinated copolymer (A) may be used alone or in combination of two or more.

[Charge Aid (B)]

The charge aid (B) is a component which plays a role of a charge retention portion in the charge retention medium. By the coating composition containing the charge aid (B), the charge density of the obtainable charge retention medium will be higher, the surface potential will be improved and at the same time, the stability of the surface potential with time will also be improved. The mechanism how the charge density is improved is considered such that when electric charge is injected to the charge retention medium, polarization of the charge aid (B) occurs, and it function as a trapping site which traps the injected charge. The charge trapped in the vicinity of the charge aid (B) is maintained by the high insulating property of the fluorinated copolymer (A) without being discharged to the outside. Further, in a system where the fluorinated copolymer (A) and the charge aid (B) are used to form a charge retention medium, in a case where the fluorinated copolymer (A) has reactive functional groups reactive with an amino group, the charge aid (B) functions as a crosslinking agent, and the thermal stability of the surface charge of the obtainable charge retention medium will be improved, that is, the charge retention property (durability) of the charge retention medium will be improved.

The charge aid (B) is at least one member selected from the group consisting of a compound (hereinafter sometimes referred to as compound (B1)) having at least one amino group and at least one reactive functional group (excluding an amino group) and a compound (hereinafter sometimes referred to as compound B2)) having at least two amino groups and having no reactive functional group (excluding an amino group).

The reactive functional group (excluding an amino group) in the compound (B1) may, for example, be a hydrolyzable silyl group (such as a trialkoxysilyl group, an alkyldialkoxysilyl group or a trichlorosilyl group), a silanol group, a hydroxy group or a thiol group. It is preferably a hydrolyzable silyl group or a silanol group with a view to further improving the surface charge and the surface retention property (durability) of a charge retention medium obtainable in such a manner that a condensate is formed by a condensation reaction of reactive functional groups in the compound (B1) and/or of the compound (B1) and the fluorinated copolymer (A), and the condensate undergoes a phase separation at the nano-order level in the fluorinated copolymer (A), and it is particularly preferably a hydrolyzable silyl group. Accordingly, the compound (B1) is preferably a compound having at least one amino group and at least one hydrolyzable silyl group, i.e. a so-called silane coupling agent having an amino group.

As the silane coupling agent having an amino group, ones having an amino group among silane coupling agents disclosed in the paragraphs [0078] to [0081] of Patent Document 5 may be mentioned.

The silane coupling agent having an amino group may be used alone or in combination of two or more. Further, the silane coupling agent having an amino group may also be a co-partially hydrolyzed condensate with a tetraalkoxysilane (such as tetramethoxysilane, tetraethoxysilane, tetrapropoxysilane).

The silane coupling agent having an amino group is, in view of excellent surface charge and charge retention property (durability) of the obtainable charge retention medium, particularly preferably γ-aminopropyltriethoxysilane, γ-aminopropylmethyldiethoxysilane, γ-aminopropyltrimethoxysilane, γ-aminopropylmethyldimethoxysilane, N-(β-aminoethyl)-γ-aminopropyltrimethoxysilane, N-(β-aminoethyl)-γ-aminopropylmethyldimethoxysilane, N-(β-aminoethyl)-γ-aminopropyltriethoxysilane, N-(β-aminoethyl)-γ-aminopropylmethyldiethoxysilane, aminophenyltrimethoxysilane, aminophenyltriethoxysilane, aminophenylmethyldimethoxysilane or aminophenylmethyldiethoxysilane.

As the compound (B2), the following may be mentioned.

Aliphatic diamine: ethylenediamine, 1,2-diaminopropane, 1,3-diaminopropane, 1,2-diaminobutane, 1,3-diaminobutane, 1,4-diaminobutane, 1,2-diaminopentane, 1,3-diaminopentane, 1,4-diaminopentane, 1,5-diaminopentane, 1,6-diaminohexane, 1,7-diaminoheptane, 1,8-diaminooctane, 1,9-diaminononane, 1,10-diaminodecane, 1,11-diaminoundecane, 1,12-diaminododecane, N-methylethylenediamine, N-ethylethylenediamine, N-propylethylenediamine, N-butylethylenediamine, N-methyl-1,3-diaminopropane, N-methyl-1,4-diaminobutane, N-methyl-1,5-diaminopentane, N-methyl-1,6-diaminohexane, N-methyl-1,7-diaminoheptane, N-methyl-1,8-diaminooctane, N-methyl-1,9-diaminononane, N-methyl-1,10-diaminodecane, N-methyl-1,1'-diaminoundecane, N-methyl-1,12-diaminododecane, 1,3-bis(aminomethyl)cyclohexane, 1,4-bis(aminomethyl)cyclohexane, piperazine, and the like.

Aromatic diamine: 1,2-phenylenediamine, 1,3-phenylenediamine, 1,4-phenylenediamine, and the like.

Aliphatic triamine: diethylenetriamine, bis(3-aminopropyl)amine, bis(4-aminobutyl)amine, bis(5-aminopentyl)amine, N-(6-aminohexyl)-1,6-hexanediamine, hexahydro-1,3,5-triazine, and the like.

Aliphatic tetramine: N,N'-bis(2-aminoethyl)ethylenediamine, N,N'-bis(3-aminopropyl)ethylenediamine, N,N'-bis(2-aminoethyl)-1,3-propanediamine, N,N'-bis(3-aminopropyl)-1,3-propanediamine, N,N'-bis(2-aminoethyl)-1,4-butanediamine, N,N'-bis(3-aminopropyl)-1,4-butanediamine, N,N'-bis(4-aminobutyl)-1,4-butanediamine, 1,4,7,10-tetraazacyclododecane, 1,4,8,11-tetraazacyclotetradecane, tris(2-aminoethyl)amine, tris(3-aminopropyl)amine, tris(4-aminobutyl)amine, tris(5-aminopentyl)amine, tris(6-aminohexyl)amine, and the like.

Aliphatic pentamine: tetraethylenepentamine, and the like.

Aliphatic hexamine: pentaethylenehexamine, and the like.

The compound (B2) may be used alone or in combination of two or more.

The compound (B2) is, in view of excellent surface charge and charge retention property (durability) of the obtainable charge retention medium, particularly preferably tris(2-aminoethyl)amine, tris(3-aminopropyl)amine, tris(4-aminobutyl)amine, tris(5-aminopentyl)amine or tris(6-aminohexyl)amine, particularly preferably tris(2-aminoethyl)amine.

[Organic Solvent (C)]

The organic solvent (C) is an organic solvent which can dissolve the fluorinated copolymer (A) at a temperature of at most the melting point of the fluorinated copolymer (A), and is an organic solvent which functions, after microparticles of the fluorinated copolymer (A) are precipitated from the fluorinated copolymer solution and uniformly dispersed in the after-mentioned step (II), as a dispersion medium to make the fine particles be present in a dispersed state at least at room temperature under normal pressure.

The organic solvent (C) may, for example, be fluorinated aromatic compounds disclosed in paragraphs [0035] to [0062] of Patent Document 6, and paragraphs [0037] to [0038] of Patent Document 7; or linear hydrocarbon compounds having a carbonyl group disclosed in paragraphs [0042] to [0048] of Patent Document 7.

Whether a certain organic solvent is the organic solvent (C) which can dissolve the fluorinated copolymer (A) can be judged whether the polarity which the organic solvent has is within a specific range. In the present invention, it is preferred to select, as the organic solvent (C), an organic solvent having a polarity within a certain specific range, based on Hansen solubility parameters.

Hansen solubility parameters are ones such that the solubility parameter introduced by Hildebrand is divided into three components of dispersion component δd, polar component δp and hydrogen bonding component δh and represented in a three dimensional space, by Hansen. The dispersion component δd represents the effect by dispersion force, the polar component δp represents the effect by dipolar intermolecular force, and the hydrogen bonding component δh represents the effect by hydrogen bonding force. The nearer coordinates of a specific resin X and coordinates of a certain organic solvent in a three dimensional space, the more likely the resin X is dissolved in the organic solvent.

The definition and calculation of Hansen solubility parameters are disclosed in the following document:

Hansen Solubility Parameters: A Users Handbook, CRC Press, 2007, edited by Charles M. Hansen.

Further, with respect to organic solvents, on which no parameter values are known in literatures, by using a computer software "Hansen Solubility Parameters in Practice (HSPiP)", Hansen solubility parameters can be estimated simply from their chemical structures.

In the present invention, by using HSPiP version 3, values of organic solvents registered in the database when registered and estimated values when not registered are employed.

Hansen solubility parameters for a specific polymer X can be determined usually by carrying out a solubility test wherein a resin X is dissolved in many different solvents, on which Hansen solubility parameters have already been known, and the solubilities are measured. Specifically, coordinates of Hansen solubility parameters of all the organic solvents used for the solubility test are represented in a three dimensional space, and such a sphere (solubility sphere) is to be found out whereby all the coordinates of the solvents which dissolved the resin X are included inside of the sphere, and coordinates of the organic solvents which did not dissolve the resin X are located outside the sphere, and the central coordinates of such a solubility sphere are taken as Hansen solubility parameters of the resin X.

And, in a case where coordinates of Hansen solubility parameters of a certain organic solvent not used for the solubility test are (δd, δp, δh), if the coordinates are included inside of the solubility sphere, such an organic solvent is considered to dissolve the resin X. On the other hand, if such coordinates are located outside the solubility sphere, such an organic solvent is considered not to be able to dissolve the resin X.

In the present invention, assuming diisopropylketone which dissolves the fluorinated copolymer (A) at a temperature of at most its melting point, which does not aggregates the fluorinated copolymer (A) at room temperature and which is the most suitable solvent to disperse the fluorinated copolymer (A) in the form of microparticles, as a substance having properties closest to those of the fluorinated copolymer (A) in terms of Hansen solubility parameters, and based on diisopropylketone as a standard (center of the solubility sphere), a group of organic solvents in a certain distance (i.e. inside of the solubility sphere) from coordinates (15.7, 5.7, 4.3) of Hansen solubility parameters of diisopropylketone can be used as the organic solvent (C).

Specifically, based on the formula: $(Ra)^2 = 4 \times (\delta d2 - \delta d1)^2 + (\delta p2 - \delta p1)^2 + (\delta h2 - \delta h1)^2$ well known as a formula to determine the distance Ra between two points in a three dimensional space of Hansen solubility parameters, the following formula (1) to estimate the distance between coordinates of diisopropylketone and coordinates of a certain organic solvent is prepared, and R represented the following formula (1) is regarded as the dissolution index for the fluorinated copolymer (A).

$$R = 4 \times (\delta d - 15.7)^2 + (\delta p - 5.7)^2 + (\delta h - 4.3)^2 \quad (1)$$

wherein δd, δp and δh respectively represent the dispersion component, the polar component and the hydrogen bonding component $[(MPa)^{1/2}]$, in Hansen solubility parameters of organic solvents.

As the organic solvent (C), one of which the dissolution index (R) is less than 49 is preferred, and one of which the dissolution index (R) is less than 36 is more preferred. The organic solvent (C) having a dissolution index (R) of less than the upper limit has a high affinity to the fluorinated copolymer (A) and provides high solubility and dispersibility of the fluorinated copolymer (A).

Even in a case where the organic solvent (C) is a solvent mixture having two or more organic solvents mixed, the dissolution index (R) of such a solvent mixture may be used as the dissolution index for the fluorinated copolymer (A). For example, average Hansen solubility parameters may be obtained from the mixing ratio (volume ratio) of the mixed solvents, and from such average values, the dissolution index (R) is calculated.

Specifically, the following solvents may be mentioned as the organic solvent (C) of which the dissolution index (R) is less than 49.

TABLE 1

| Organic solvents | δd | δp | δh | R | |
|---|---|---|---|---|---|
| Acetone | 15.5 | 10.4 | 7.0 | 29.5 | DB |
| Methyl ethyl ketone | 16.0 | 9.0 | 5.1 | 11.9 | DB |
| 2-Pentanone | 16.0 | 7.6 | 4.7 | 4.1 | DB |
| Methyl isopropyl ketone | 15.8 | 6.8 | 5.0 | 1.7 | calc |
| 2-Hexanone | 15.3 | 6.1 | 4.1 | 0.8 | DB |
| Methyl isobutyl ketone | 15.3 | 6.1 | 4.1 | 0.8 | DB |
| Pinacolin | 15.2 | 5.7 | 5.3 | 2.0 | calc |
| 2-Heptanone | 16.2 | 5.7 | 4.1 | 1.0 | DB |
| 4-Heptanone | 15.8 | 7.6 | 4.9 | 4.0 | DB |
| Diisopropyl ketone | 15.7 | 5.7 | 4.3 | 0 | calc |
| Isoamyl methyl ketone | 16.0 | 5.7 | 4.1 | 0.4 | DB |
| 2-Octanone | 16.1 | 4.7 | 4.0 | 1.7 | calc |
| 2-Nonanone | 16.0 | 5.5 | 3.8 | 0.7 | calc |
| Diisobutyl ketone | 16.0 | 3.7 | 4.1 | 4.4 | DB |
| 2-Decanone | 16.1 | 4.6 | 3.8 | 2.1 | calc |
| Cyclohexanone | 17.8 | 8.4 | 5.1 | 25.6 | DB |
| 2-Methylcyclohexanone | 17.6 | 7.8 | 4.7 | 19.0 | DB |
| 3-Methylcyclohexanone | 17.7 | 7.7 | 4.7 | 20.2 | DB |
| 4-Ethylcyclohexanone | 17.3 | 7.7 | 4.5 | 14.3 | calc |
| 2,6-Dimethylcyclohexanone | 17.3 | 8.4 | 5.3 | 18.5 | calc |
| 3,3,5-Trimethylcyclohexanone | 17.0 | 7.0 | 5.0 | 8.9 | calc |
| 4-tert-butylcyclohexanone | 16.5 | 6.4 | 4.6 | 3.1 | calc |
| Cycloheptanone | 17.2 | 10.6 | 4.8 | 33.3 | DB |
| Isophorone | 17.0 | 8.0 | 5.0 | 12.5 | DB |
| (−)-Fenchone | 17.6 | 7.5 | 3.9 | 17.8 | calc |
| Ethyl formate | 15.5 | 8.4 | 8.4 | 24.3 | DB |
| Propyl formate | 15.5 | 7.1 | 8.6 | 20.6 | DB |
| Isopropyl formate | 15.4 | 6.6 | 7.4 | 10.8 | calc |
| Butyl formate | 15.7 | 6.5 | 9.2 | 24.7 | DB |
| Isobutyl formate | 15.5 | 6.5 | 6.7 | 6.6 | DB |
| sec-Butyl formate | 15.2 | 5.3 | 6.6 | 6.5 | calc |
| t-Butyl formate | 14.8 | 5.4 | 7.4 | 12.9 | calc |
| Amyl formate | 15.7 | 5.0 | 6.2 | 4.1 | calc |
| Isoamyl formate | 15.3 | 4.9 | 6.3 | 5.3 | calc |
| Hexyl formate | 15.8 | 4.5 | 5.6 | 3.2 | calc |
| Cyclohexyl formate | 16.8 | 4.0 | 6.1 | 11.0 | calc |
| Heptyl formate | 15.8 | 5.3 | 5.2 | 1.0 | calc |
| Octyl formate | 15.9 | 4.4 | 5.1 | 2.5 | calc |
| 2-Ethylhexyl formate | 15.7 | 3.8 | 5.2 | 4.4 | calc |
| Nonyl formate | 16.0 | 4.1 | 4.9 | 3.3 | calc |
| Methyl acetate | 15.5 | 7.2 | 7.6 | 13.3 | DB |
| Ethyl acetate | 15.8 | 5.3 | 7.2 | 8.6 | DB | calc: calculated value,
DB: data base value

TABLE 2

| Organic solvents | δd | δp | δh | R | |
|---|---|---|---|---|---|
| Propyl acetate | 15.3 | 4.3 | 7.6 | 13.5 | DB |
| Isopropyl acetate | 14.9 | 4.5 | 8.2 | 19.2 | DB |
| Butyl acetate | 15.8 | 3.7 | 6.3 | 8.0 | DB |
| Isobutyl acetate | 15.1 | 3.7 | 6.3 | 9.4 | DB |
| sec-Butyl acetate | 15.0 | 3.7 | 7.6 | 16.9 | DB |
| t-Butyl acetate | 15.0 | 3.7 | 6.0 | 8.9 | DB |
| Amyl acetate | 15.8 | 3.3 | 6.1 | 9.0 | DB |
| Isoamyl acetate | 15.3 | 3.1 | 7.0 | 14.7 | DB |
| Hexyl acetate | 15.8 | 2.9 | 5.9 | 10.4 | DB |
| Cyclohexyl acetate | 16.9 | 2.8 | 5.6 | 15.9 | calc |
| Heptyl acetate | 15.8 | 2.9 | 5.5 | 9.3 | DB |
| Octyl acetate | 15.8 | 2.9 | 5.1 | 8.5 | DB |
| 2-Ethylhexyl acetate | 15.8 | 2.9 | 5.1 | 8.5 | DB |
| 2,2,2-Trifluoroethyl acetate | 15.4 | 5.3 | 6.0 | 3.4 | calc |
| 2,2,3,3-Tetrafluoropropyl acetate | 15.1 | 2.9 | 4.8 | 9.5 | calc |
| 2,2,3,3,3-Pentafluoropropyl acetate | 13.3 | 3.1 | 4.5 | 29.8 | calc |
| 1,1,1,3,3,3-Hexafluoro-2-propyl acetate | 15.1 | 4.9 | 4.6 | 2.2 | calc |
| 2,2-Bis(trifluoromethyl)propyl acetate | 15.3 | 3.1 | 4.6 | 7.5 | calc |
| 2,2,3,3,4,4,4-Heptafluorobutyl acetate | 13.8 | 2.4 | 3.6 | 25.8 | calc |
| 2,2,3,4,4,4-Hexafluorobutyl acetate | 15.0 | 2.6 | 3.8 | 11.8 | calc |
| 2,2,3,3,4,4,5,5,5-Nonafluoropentyl acetate | 14.2 | 1.9 | 3.0 | 25.1 | calc |
| 2,2,3,3,4,4,5,5-Octafluoropentyl acetate | 15.5 | 1.7 | 3.1 | 17.6 | calc |
| 3,3,4,4,5,5,6,6,6-Nonafluorohexyl acetate | 14.4 | 1.8 | 2.8 | 24.2 | calc |
| 4,4,5,5,6,6,7,7,7-Nonafluoroheptyl acetate | 14.5 | 2.5 | 2.7 | 18.6 | calc |
| 2,2,3,3,4,4,5,5,6,6,7,7-Dodecafluoroheptyl acetate | 15.8 | 1.0 | 2.1 | 27.0 | calc |
| 7,7,8,8,8-Pentafluorooctyl acetate | 14.4 | 2.6 | 3.7 | 16.7 | calc |
| 3,3,4,4,5,5,6,6,7,7,8,8,8-Tridecafluorooctyl acetate | 14.8 | 1.1 | 2.0 | 29.7 | calc |
| Methyl propionate | 15.5 | 6.5 | 7.7 | 12.4 | DB |
| Ethyl propionate | 15.5 | 6.1 | 4.9 | 0.7 | DB |
| Propyl propionate | 15.5 | 5.6 | 5.7 | 2.1 | DB |
| Isopropyl propionate | 15.7 | 4.2 | 5.9 | 4.8 | calc |
| Butyl propionate | 15.7 | 5.5 | 5.9 | 2.6 | DB |
| Isobutyl propionate | 15.5 | 3.7 | 5.5 | 5.6 | calc |
| sec-Butyl propionate | 15.6 | 3.5 | 5.4 | 6.1 | calc |
| t-Butyl propionate | 15.2 | 3.6 | 6.1 | 8.7 | calc |
| Amyl propionate | 15.8 | 5.2 | 5.7 | 2.3 | DB |
| Isoamyl propionate | 15.7 | 5.2 | 5.6 | 1.9 | DB |
| Hexyl propionate | 16.0 | 3.2 | 4.8 | 6.9 | calc |
| Cyclohexyl propionate | 16.8 | 2.6 | 5.1 | 15.1 | calc |
| Heptyl propionate | 15.9 | 3.9 | 4.5 | 3.4 | calc | calc: calculated value,
DB: data base value

TABLE 3

| Organic solvents | δd | δp | δh | R | |
|---|---|---|---|---|---|
| Methyl butyrate | 15.8 | 4.8 | 6.7 | 6.6 | calc |
| Ethyl butyrate | 15.5 | 5.6 | 5.0 | 0.7 | DB |
| Propyl butyrate | 15.8 | 4.3 | 5.6 | 3.7 | calc |
| Isopropyl butyrate | 15.8 | 4.2 | 5.6 | 4.0 | calc |
| Butyl butyrate | 15.6 | 2.9 | 5.6 | 9.6 | DB |
| Isobutyl butyrate | 15.6 | 3.7 | 5.2 | 4.9 | calc |
| sec-Butyl butyrate | 15.6 | 3.5 | 5.2 | 5.7 | calc |
| t-Butyl butyrate | 15.3 | 3.6 | 5.8 | 7.3 | calc |
| Amyl butyrate | 15.9 | 3.5 | 5.0 | 5.5 | calc |
| Isoamyl butyrate | 15.7 | 3.4 | 5.1 | 5.9 | calc |
| Hexyl butyrate | 16.0 | 3.2 | 4.7 | 6.8 | calc |
| Cyclohexyl butyrate | 16.7 | 2.7 | 4.9 | 13.4 | calc |
| Methyl isobutyrate | 15.7 | 4.7 | 6.6 | 6.3 | calc |
| Ethyl isobutyrate | 15.7 | 4.2 | 5.9 | 4.8 | calc |
| Propyl isobutyrate | 15.8 | 4.2 | 5.6 | 4.0 | calc |
| Isopropyl isobutyrate | 15.7 | 4.1 | 5.5 | 4.0 | calc |
| Butyl isobutyrate | 15.8 | 3.7 | 5.1 | 4.7 | calc |
| Isobutyl isobutyrate | 15.1 | 2.8 | 5.8 | 12.1 | DB |
| sec-Butyl isobutyrate | 15.6 | 3.5 | 5.2 | 5.7 | calc |
| t-Butyl isobutyrate | 15.2 | 3.6 | 5.7 | 7.4 | calc |
| Amyl isobutyrate | 15.9 | 3.4 | 5.0 | 5.9 | calc |
| Isoamyl isobutyrate | 15.6 | 3.4 | 5.0 | 5.8 | calc |
| Hexyl isobutyrate | 15.9 | 3.2 | 4.6 | 6.5 | calc |
| Cyclohexyl isobutyrate | 16.7 | 2.7 | 4.9 | 13.4 | calc |
| Methyl valerate | 15.9 | 4.1 | 6.0 | 5.6 | calc |
| Ethyl valerate | 15.9 | 3.8 | 5.4 | 5.0 | calc |
| Propyl valerate | 15.9 | 3.8 | 5.2 | 4.6 | calc |
| Isopropyl valerate | 15.8 | 3.7 | 5.1 | 4.7 | calc |
| Butyl valerate | 15.9 | 3.4 | 4.8 | 5.7 | calc |
| Isobutyl valerate | 15.6 | 3.3 | 4.9 | 6.2 | calc |
| sec-Butyl valerate | 15.7 | 3.1 | 4.8 | 7.0 | calc |
| t-Butyl valerate | 15.4 | 3.3 | 5.3 | 7.1 | calc |
| Amyl valerate | 16.0 | 3.1 | 4.7 | 7.3 | calc |
| Isoamyl valerate | 15.7 | 3.1 | 4.7 | 6.9 | calc |
| Methyl isovalerate | 15.5 | 4.0 | 6.0 | 5.9 | calc |
| Ethyl isovalerate | 15.5 | 3.7 | 5.5 | 5.6 | calc |
| Propyl isovalerate | 15.6 | 3.7 | 5.2 | 4.9 | calc |
| Isopropyl isovalerate | 15.5 | 3.6 | 5.2 | 5.4 | calc |
| Butyl isovalerate | 15.6 | 3.3 | 4.9 | 6.2 | calc |
| Isobutyl isovalerate | 15.4 | 3.2 | 4.9 | 7.0 | calc |
| sec-Butyl isovalerate | 15.4 | 3.1 | 4.9 | 7.5 | calc |
| t-Butyl isovalerate | 15.1 | 3.2 | 5.4 | 8.9 | calc | calc: calculated value,
DB: data base value

TABLE 4

| Organic solvents | δd | δp | δh | R | |
|---|---|---|---|---|---|
| Amyl isovalerate | 15.7 | 3.1 | 4.7 | 6.9 | calc |
| Isoamyl isovalerate | 15.5 | 3.0 | 4.8 | 7.7 | calc |
| Methyl hexanoate | 16.0 | 3.7 | 5.7 | 6.3 | calc |
| Ethyl hexanoate | 15.5 | 3.2 | 5.9 | 9.0 | DB |
| Propyl hexanoate | 15.9 | 3.5 | 5.0 | 5.5 | calc |
| Isopropyl hexanoate | 15.9 | 3.4 | 5.0 | 5.9 | calc |
| Butyl hexanoate | 16.0 | 3.1 | 4.7 | 7.3 | calc |
| Isobutyl hexanoate | 15.7 | 3.1 | 4.7 | 6.9 | calc |
| sec-Butyl hexanoate | 15.8 | 2.9 | 4.7 | 8.0 | calc |
| t-Butyl hexanoate | 15.5 | 3.0 | 5.2 | 8.3 | calc |
| Methyl heptanoate | 16.0 | 3.4 | 5.2 | 6.5 | calc |
| Ethyl heptanoate | 16.0 | 3.2 | 4.8 | 6.9 | calc |
| Propyl heptanoate | 16.0 | 3.2 | 4.7 | 6.8 | calc |
| Isopropyl heptanoate | 15.9 | 3.2 | 4.6 | 6.5 | calc |
| Methyl octanoate | 16.0 | 4.2 | 4.8 | 2.9 | calc |
| Ethyl octanoate | 15.9 | 3.9 | 4.5 | 3.4 | calc |
| Methyl nonanoate | 16.1 | 3.5 | 4.8 | 5.7 | calc |
| Methyl cyclohexanecarboxylate | 16.9 | 2.8 | 5.6 | 15.9 | calc |
| Ethyl cyclohexanecarboxylate | 16.8 | 2.6 | 5.1 | 15.1 | calc |
| Propyl cyclohexanecarboxylate | 16.7 | 2.7 | 4.9 | 13.4 | calc |
| Isopropyl cyclohexanecarboxylate | 16.7 | 2.7 | 4.9 | 13.4 | calc |
| 2,2,2-Trifluoroethyl cyclohexanecarboxylate | 16.5 | 3.0 | 4.5 | 9.9 | calc |
| Bis(2,2,2-trifluoroethyl) succinate | 15.8 | 5.1 | 6.0 | 3.3 | calc |
| Bis(2,2,2-trifluoroethyl) glutarate | 15.8 | 5.6 | 5.7 | 2.0 | calc |
| Bis(2,2,2-trifluoroethyl) adipate | 15.9 | 4.9 | 5.6 | 2.5 | calc |
| Methyl trifluoroacetate | 15.3 | 6.0 | 6.4 | 5.1 | calc |
| Ethyl trifluoroacetate | 15.3 | 5.3 | 5.6 | 2.5 | calc |
| Propyl trifluoroacetate | 15.4 | 5.1 | 5.4 | 1.9 | calc |
| Isopropyl trifluoroacetate | 15.3 | 5.0 | 5.3 | 2.1 | calc |
| Butyl trifluoroacetate | 15.5 | 4.5 | 4.8 | 1.9 | calc |
| Isobutyl trifluoroacetate | 15.2 | 4.4 | 4.9 | 3.1 | calc |
| sec-Butyl trifluoroacetate | 15.2 | 4.2 | 4.9 | 3.6 | calc |
| t-Butyl trifluoroacetate | 14.9 | 4.3 | 5.5 | 6.0 | calc |
| Amyl trifluoroacetate | 15.6 | 4.1 | 4.7 | 2.8 | calc |
| Isoamyl trifluoroacetate | 15.3 | 4.0 | 4.8 | 3.8 | calc |
| Hexyl trifluoroacetate | 15.7 | 3.8 | 4.4 | 3.6 | calc |
| Cyclohexyl trifluoroacetate | 16.5 | 3.3 | 4.6 | 8.4 | calc |
| Heptyl trifluoroacetate | 15.7 | 4.5 | 4.1 | 1.5 | calc |
| Octyl trifluoroacetate | 15.8 | 3.8 | 4.1 | 3.7 | calc |
| 2-Ethylhexyl trifluoroacetate | 15.7 | 3.3 | 4.2 | 5.8 | calc |
| Methyl difluoroacetate | 16.1 | 7.5 | 6.3 | 7.9 | calc |
| Ethyl difluoroacetate | 16.0 | 6.5 | 5.5 | 2.4 | calc | calc: calculated value,
DB: data base value

TABLE 5

| Organic solvents | δd | δp | δh | R | |
|---|---|---|---|---|---|
| Methyl perfluoropropionate | 12.9 | 3.4 | 4.7 | 36.8 | calc |
| Ethyl perfluoropropionate | 13.2 | 3.1 | 4.3 | 31.8 | calc |
| Methyl perfluorobutanoate | 13.5 | 2.6 | 3.7 | 29.3 | calc |
| Ethyl perfluorobutanoate | 13.7 | 2.4 | 3.4 | 27.7 | calc |
| Methyl perfluoropentanoate | 14.0 | 2.0 | 3.0 | 26.9 | calc |
| Ethyl perfluoropentanoate | 14.1 | 1.9 | 2.8 | 26.9 | calc |
| Methyl 2,2,3,3,4,4,5,5-octafluoropentanoate | 15.4 | 1.8 | 3.1 | 17.0 | calc |
| Ethyl 2,2,3,3,4,4,5,5-octafluoropentanoate | 15.5 | 1.7 | 2.9 | 18.1 | calc |
| Methyl perfluoroheptanoate | 14.6 | 1.3 | 2.0 | 29.5 | calc |
| Ethyl perfluoroheptanoate | 14.7 | 1.2 | 2.0 | 29.5 | calc |
| Methyl 2,2,3,3,4,4,5,5,6,6,7,7-dodecafluoroheptanoate | 15.7 | 1.1 | 1.2 | 30.8 | calc |
| Ethyl 2,2,3,3,4,4,5,5,6,6,7,7-dodecafluoroheptanoate | 15.7 | 1.1 | 2.0 | 26.5 | calc |
| Methyl 2-trifluoromethyl-3,3,3-trifluoropropionate | 15.1 | 4.9 | 4.6 | 2.2 | calc |
| Ethyl 2-trifluoromethyl-3,3,3-trifluoropropionate | 15.1 | 4.5 | 4.3 | 2.9 | calc |
| 2-Ethoxyethyl acetate | 15.9 | 4.7 | 10.6 | 40.9 | DB |
| 2-Propoxyethyl acetate | 16.0 | 5.2 | 7.2 | 9.0 | calc |
| 2-Butoxyethyl acetate | 15.3 | 7.5 | 6.8 | 10.1 | DB |
| 2-Pentyloxyethyl acetate | 16.1 | 4.2 | 6.3 | 6.9 | calc |
| 2-Hexyloxyethyl acetate | 16.1 | 3.9 | 5.9 | 6.4 | calc |
| 1-Methoxy-2-acetoxypropane | 15.6 | 5.6 | 9.8 | 30.3 | DB |
| 1-Ethoxy-2-acetoxypropane | 15.6 | 6.3 | 7.7 | 12.0 | DB |
| 1-Propoxy-2-acetoxypropane | 15.9 | 4.6 | 6.6 | 6.7 | calc |
| 1-Butoxy-2-acetoxypropane | 15.9 | 4.2 | 6.1 | 5.7 | calc |
| 1-Pentyloxy-2-acetoxypropane | 16.0 | 3.9 | 5.9 | 6.2 | calc |
| 3-Methoxybutyl acetate | 15.3 | 4.1 | 8.1 | 17.6 | DB |
| 3-Ethoxybutyl acetate | 15.9 | 4.3 | 6.4 | 6.5 | calc |
| 3-Propoxybutyl acetate | 15.9 | 4.2 | 6.1 | 5.7 | calc |
| 3-Butoxybutyl acetate | 16.0 | 3.9 | 5.7 | 5.6 | calc |
| 3-Methoxy-3-methylbutyl acetate | 15.3 | 3.8 | 7.7 | 15.8 | DB |
| 3-Ethoxy-3-methylbutyl acetate | 15.8 | 4.7 | 6.0 | 3.9 | calc |
| 3-Propoxy-3-methylbutyl acetate | 15.8 | 4.7 | 5.8 | 3.3 | calc |
| 4-Methoxybutyl acetate | 16.0 | 5.4 | 6.8 | 6.7 | calc |
| 4-Ethoxybutyl acetate | 16.0 | 5.0 | 6.3 | 4.9 | calc |
| 4-Propoxybutyl acetate | 16.0 | 4.9 | 6.0 | 3.9 | calc |
| 4-Butoxybutyl acetate | 16.0 | 4.4 | 5.6 | 3.7 | calc |
| 2-(Perfluoropropyloxy)-2,3,3,3-tetrafluoropropyl acetate | 13.7 | 2.8 | 3.2 | 25.6 | calc | calc: calculated value,
DB: data base value

TABLE 6

| Organic solvents | δd | δp | δh | R | |
|---|---|---|---|---|---|
| Dimethyl carbonate | 15.5 | 8.6 | 9.7 | 37.7 | DB |
| Ethylmethyl carbonate | 15.3 | 7.3 | 6.1 | 6.4 | calc |
| Diethyl carbonate | 15.1 | 6.3 | 3.5 | 2.4 | DB |
| Dipropyl carbonate | 15.5 | 5.8 | 4.9 | 0.5 | calc |
| Dibutyl carbonate | 15.6 | 4.7 | 4.2 | 1.1 | calc |
| Bis(2,2,2-trifluoroethyl) carbonate | 14.9 | 6.5 | 3.8 | 3.4 | calc |
| Bis(2,2,3,3-tetrafluoropropyl) carbonate | 14.5 | 2.9 | 2.6 | 16.5 | calc |
| Tetrahydrofuran | 16.8 | 5.7 | 8.0 | 18.5 | DB |
| Butyronitrile | 15.3 | 12.4 | 5.1 | 46.2 | DB |
| Isobutyronitrile | 15.7 | 10.5 | 4.5 | 23.1 | calc |
| Valeronitrile | 15.3 | 11.0 | 4.8 | 29.0 | DB |
| Isovaleronitrile | 15.4 | 8.7 | 4.1 | 9.4 | calc |
| Capronitrile | 16.0 | 7.7 | 3.9 | 4.5 | calc |
| Isocapronitrile | 15.6 | 7.6 | 4.0 | 3.7 | calc |
| Heptanenitrile | 16.0 | 6.8 | 3.6 | 2.1 | calc |
| Octanenitrile | 16.0 | 7.4 | 3.3 | 4.3 | calc |
| Nonanenitrile | 16.1 | 6.3 | 3.4 | 1.8 | calc |
| Decanenitrile | 16.1 | 5.8 | 3.4 | 1.5 | calc |
| Pentafluorobenzonitrile | 18.3 | 7.7 | 1.1 | 41.3 | calc |
| 3,5-Bis(trifluoromethyl)benzonitrile | 17.9 | 8.7 | 1.5 | 36.2 | calc |
| 2-(Trifluoromethyl)benzonitrile | 18.0 | 10.0 | 2.6 | 42.5 | calc |
| 3-(Trifluoromethyl)benzonitrile | 18.0 | 8.5 | 1.9 | 34.8 | calc |
| 3-(Trifluoromethoxy)benzonitrile | 18.0 | 9.7 | 4.5 | 37.2 | calc |
| Methyl pentafluorobenzoate | 17.8 | 6.6 | 2.2 | 22.9 | calc |
| Ethyl pentafluorobenzoate | 17.5 | 6.0 | 2.0 | 18.3 | calc |

TABLE 6-continued

| Organic solvents | δd | δp | δh | R | |
|---|---|---|---|---|---|
| Methyl 3-(trifluoromethyl)benzoate | 17.6 | 7.4 | 2.7 | 19.9 | calc |
| Methyl 4-(trifluoromethyl)benzoate | 17.8 | 8.3 | 3.2 | 25.6 | calc |
| Methyl 3,5-bis(trifluoromethyl)benzoate | 17.5 | 7.8 | 2.2 | 21.8 | calc |
| Pentafluoronitrobenzene | 18.6 | 5.0 | 1.9 | 39.9 | calc |
| 1-(Pentafluorophenyl)ethanol | 17.9 | 4.0 | 7.8 | 34.5 | calc |
| Pentafluorophenyl formate | 18.0 | 4.7 | 4.2 | 22.2 | calc |
| Pentafluorophenyl acetate | 18.0 | 3.4 | 3.9 | 26.6 | calc |
| Pentafluorophenyl propionate | 17.7 | 3.2 | 3.6 | 22.7 | calc |
| Pentafluorophenyl butanoate | 17.6 | 3.2 | 3.6 | 21.2 | calc |
| Pentafluorophenyl pentanoate | 17.5 | 2.9 | 3.4 | 21.6 | calc |
| 2',3',4',5',6'-Pentafluoroacetophenone | 18.5 | 6.6 | 2.8 | 34.4 | calc |
| 3',5'-Bis(trifluoromethyl)acetophenone | 18.0 | 7.8 | 2.7 | 28.1 | calc |
| 3'-(Trifluoromethyl)acetophenone | 18.2 | 7.4 | 3.3 | 28.9 | calc |
| Pentafluoroanisole | 17.9 | 3.5 | 3.7 | 24.6 | calc |
| 3,5-Bis(trifluoromethyl)anisole | 17.6 | 5.6 | 3.3 | 15.5 | calc |
| Pentafluoropyridine | 15.4 | 8.0 | 4.8 | 5.9 | calc |
| Benzotrifluoride | 17.5 | 8.8 | 0.0 | 41.1 | DB | calc: calculated value,
DB: data base value

TABLE 7

| Organic solvents | δd | δp | δh | R | |
|---|---|---|---|---|---|
| 4-Chlorobenzotrifluoride | 18.4 | 5.5 | 2.6 | 32.1 | calc |
| 1,3-Bis(trifluoromethyl)benzene | 17.0 | 6.8 | 0.0 | 26.5 | calc |
| Perfluorotoluene | 17.3 | 2.5 | 0.3 | 36.5 | calc |
| 2,2,2-Trifluoroethyl benzoate | 17.5 | 7.8 | 3.4 | 18.2 | calc |
| 2,2,3,3-Tetrafluoropropyl benzoate | 17.1 | 5.7 | 2.8 | 10.1 | calc |
| 2,2,3,3,3-Pentafluoropropyl benzoate | 15.6 | 5.7 | 2.7 | 2.6 | calc |
| 1,1,1,3,3,3-Hexafluoro-2-propyl benzoate | 16.9 | 7.0 | 2.8 | 9.7 | calc |
| 2,2-Bis(trifluoromethyl)propyl benzoate | 16.8 | 5.2 | 3.1 | 6.5 | calc |
| 2,2,3,3,4,4,4-Heptafluorobutyl benzoate | 15.7 | 4.8 | 2.2 | 5.2 | calc |
| 2,2,3,3,4,4-Hexafluorobutyl benzoate | 16.7 | 5.1 | 2.3 | 8.4 | calc |
| 2,2,3,3,4,4,5,5-Nonafluoropentyl benzoate | 15.8 | 4.2 | 1.8 | 8.5 | calc |
| 2,2,3,3,4,4,5,5-Octafluoropentyl benzoate | 17.0 | 4.1 | 1.9 | 15.1 | calc |
| Bis(2,2,2-trifluoroethyl)phthalate | 17.0 | 9.8 | 3.4 | 24.4 | calc |
| 5-(Perfluorobutyl)bicyclo[2.2.1]-2-heptene | 15.4 | 0.7 | 1.2 | 35.0 | calc |
| 5-(Perfluorohexyl)bicyclo[2.2.1]-2-heptene | 15.7 | 0.3 | 0.7 | 42.1 | calc |
| 5-(Perfluorobutyl)bicyclo[2.2.1]heptane | 15.5 | 1.0 | 1.0 | 33.1 | calc |
| 5-(Perfluorohexyl)bicyclo[2.2.1]heptane | 15.7 | 0.5 | 0.7 | 40.7 | calc |
| HFC-c447ef(1,1,2,2,3,3,4-heptafluorocyclopentane) | 14.7 | 2.1 | 3.1 | 18.4 | calc |
| 1,1,1,2,3,3-Hexafluoro-4-(1,1,2,3,3,3-hexafluoropropoxy)pentane | 14.3 | 1.4 | 1.2 | 35.9 | calc |
| 2,2,3,4,4,4-Hexafluoro-1-butanol | 14.6 | 3.6 | 8.3 | 25.3 | calc |
| 2,2,3,3,4,4,5,5-Octafluoro-1-pentanol | 15.3 | 2.2 | 6.7 | 18.7 | calc |
| 2,2-Bis(trifluoromethyl)-1-propanol | 15.0 | 4.0 | 8.6 | 23.3 | calc |
| 3,3,4,4,5,5,6,6,6-Nonafluoro-1-hexanol | 14.0 | 2.2 | 5.8 | 26.1 | calc |
| 2,3,3,3-Tetrafluoro-2-(perfluoropropyloxy)-1-propanol | 13.2 | 3.5 | 6.0 | 32.7 | calc |
| 4,4,5,5,6,6,7,7,7-Nonafluoro-1-heptanol | 14.1 | 3.1 | 5.4 | 18.2 | calc |
| 2,2,3,3,4,4,5,5,6,6,7,7-Dodecafluoro-1-heptanol | 15.7 | 1.3 | 4.6 | 19.5 | calc |
| 3,3,4,4,5,5,6,6,7,7,8,8,8-Tridecafluoro-1-octanol | 14.6 | 1.4 | 4.2 | 23.3 | calc |
| 7,7,8,8-Pentafluoro-1-octanol | 14.1 | 3.2 | 6.6 | 21.8 | calc |
| 4,4,5,5,6,6,7,7,8,8,9,9,9-Tridecafluoro-1-nonanol | 14.7 | 2.1 | 4.0 | 17.1 | calc |
| 7,8,8,8-Tetrafluoro-7-(trifluoromethyl)-1-octanol | 15.1 | 3.7 | 5.6 | 7.1 | calc |
| 2,3,3,3-Tetrafluoro-2-(1,1,2,3,3,3-hexafluoro-2-(perfluoropropyloxy)propyloxy)-1-propanol | 13.5 | 3.2 | 4.4 | 25.6 | calc | calc: calculated value,
DB: data base value

As the organic solvent (C), the following solvents are preferred, since they have a high affinity with the fluorinated copolymer (A), and they provide a sufficiently high solubility and dispersibility of the fluorinated copolymer (A).

Methyl ethyl ketone, 2-pentanone, methyl isopropyl ketone, 2-hexanone, methyl isobutyl ketone, pinacoline, 2-heptanone, 4-heptanone, diisopropyl ketone, isoamyl methyl ketone, 2-octanone, 2-nonanone, diisobutyl ketone, cyclohexanone, 2-methylcyclohexanone, 3-methylcyclohexanone, 4-ethylcyclohexanone, 2,6-dimethylcyclohexanone, 3,3,5-trimethylcyclohexanone, cycloheptanone, isophorone, (−)-fenchone, propyl formate, isopropyl formate, butyl formate, isobutyl formate, sec-butyl formate, amyl formate, isoamyl formate, hexyl formate, heptyl formate, octyl formate, 2-ethylhexyl formate, ethyl acetate, propyl acetate, isopropyl acetate, butyl acetate, isobutyl acetate, sec-butyl acetate, amyl acetate, isoamyl acetate, hexyl acetate, cyclohexyl acetate, heptyl acetate, 2,2,2-trifluoroethyl acetate, 2,2,3,3-tetrafluoropropyl acetate, 2,2,3,3,3-pentafluoropropyl acetate, 1,1,1,3,3,3-hexafluoro-2-propyl acetate, 2,2-bis(trifluoromethyl)propyl acetate, 2,2,3,3,4,4,4-heptafluorobutyl acetate, 2,2,3,4,4,4-hexafluorobutyl acetate, 2,2,3,3,4,4,5,5,5-nonafluoropentyl acetate, 2,2,3,3,4,4,5,5-octafluoropentyl acetate, 3,3,4,4,5,5,6,6,6-nonafluorohexyl acetate, 4,4,5,5,6,6,7,7,7-nonafluoroheptyl acetate, 2,2,3,3,4,4,5,5,6,6,7,7-dodecafluorohepthyl acetate, methyl propionate, ethyl propionate, propyl propionate, isopropyl propionate, butyl propionate, isobutyl propionate, sec-butyl propionate, t-butyl propionate, amyl propionate, isoamyl propionate, hexyl propionate, cyclohexyl propionate, methyl butyrate, ethyl butyrate, propyl butyrate, isopropyl butyrate, butyl butyrate, isobutyl butyrate, sec-butyl butyrate, t-butyl butyrate, amyl butyrate, isoamyl butyrate, methyl isobutyrate, ethyl isobutyrate, propyl isobutyrate, isopropyl isobutyrate, butyl isobutyrate, isobutyl isobutyrate, sec-butyl isobutyrate, t-butyl isobutyrate, amyl isobutyrate, isoamyl isobutyrate, methyl valerate, ethyl valerate, propyl valerate, isopropyl valerate, butyl valerate, isobutyl valerate, sec-butyl valerate, t-butyl valerate, methyl isovalerate, ethyl isovalerate, propyl isovalerate, isopropyl isovalerate, butyl isovalerate, isobutyl isovalerate, sec-butyl isovalerate, t-butyl isovalerate, methyl hexanoate, ethyl hexanoate, propyl hexanoate, isopropyl hexanoate, methyl heptanoate, ethyl heptanoate, methyl octanoate, methyl cyclohexanecarboxylate, ethyl cyclohexanecarboxylate, 2,2,2-trifluoroethyl cyclohexanecarboxylate, bis(2,2,2-trifluoroethyl) succinate, bis(2,2,2-trifluoroethyl) glutarate, ethyl trifluoroacetate, propyl trifluoroacetate, isopropyl trifluoroacetate, butyl trifluoroacetate, isobutyl trifluoroacetate, sec-butyl trifluoroacetate, t-butyl trifluoroacetate, amyl trifluoroacetate, isoamyl trifluoroacetate, hexyl trifluoroacetate, cyclohexyl trifluoroacetate, heptyl trifluoroacetate, ethyl difluoroacetate, ethyl perfluoropropionate, methyl perfluorobutanoate, ethyl perfluorobutanoate, methyl perfluoropentanoate, ethyl perfluoropentanoate, methyl 2,2,3,3,4,4,5,5-octafluoropentanoate, ethyl 2,2,3,3,4,4,5,5-octafluoropentanoate, methyl perfluoroheptanoate, ethyl perfluoroheptanoate, methyl 2,2,3,3,4,4,5,5,6,6,7,7-dodecafluoroheptanoate, ethyl 2,2,3,3,4,4,5,5,6,6,7,7-dodecafluoroheptanoate, methyl 2-trifluoromethyl-3,3,3-trifluoropropionate, ethyl 2-trifluoromethyl-3,3,3-trifluoropropionate, 2-propxyethyl acetate, 2-butoxyethyl acetate, 2-pentyloxyethyl acetate, 1-methoxy-2-acetoxypropane, 1-ethoxy-2-acetoxypropane, 1-propoxy-2-acetoxypropane, 1-butoxy-2-acetoxypropane, 3-methoxybutyl acetate, 3-ethoxybutyl acetate, 3-propoxybutyl acetate, 3-methoxy-3-methylbutyl acetate, 3-ethoxy-3-methylbutyl acetate, 4-methoxybutyl acetate, 4-ethoxybutyl acetate, 4-propoxybutyl acetate, diethyl carbonate, dipropyl carbonate, dibutyl carbonate, bis(2,2,2-trifluoroethyl) carbonate, bis(2,2,3-tetrafluoropropyl) carbonate, tetrahydrofuran, butyronitrile, isobutyronitrile, valeronitrile, isovaleronitrile, capronitrile, isocapronitrile, heptanenitrile, octanenitrile, nonanenitrile, 3-(trifluoromethyl)benzonitrile, methyl pentafluorobenzoate, ethyl pentafluorobenzoate, methyl-3-(trifluoromethyl)benzoate, methyl 4-(trifluoromethyl)benzoate, methyl 3,5-bis(trifluoromethyl)benzoate, 1-(pentafluorophenyl)ethanol, pentafluorophenyl formate, pentafluorophenyl acetate, pentafluorophenyl propanoate, pentafluorophenyl butanoate, pentafluorophenyl pentanoate, 2',3',4',5',6'-pentafluoroacetophenone, 3',5'-bis(trifluoromethyl)acetophenone, 3'-(trifluoromethyl)acetophenone, pentafluoroanisole, 3,5-bis(trifluoromethyl)anisole, pentafluoropyridine, 4-chlorobenzotrifluoride, 1,3-bis(trifluoromethyl)benzene, 2,2,2-trifluoroethyl benzoate, 2,2,3,3-tetrafluoropropyl benzoate, 2,2,3,3,3-pentafluoropropyl benzoate, 1,1,1,3,3,3-hexafluoro-2-propyl benzoate, 2,2-bis(trifluoromethyl)propyl benzoate, 2,2,3,3,4,4,4-heptafluorobutyl benzoate, 2,2,3,4,4,4-hexafluorobutyl benzoate, 2,2,3,3,4,4,5,5,5-nonafluoropentyl benzoate, 2,2,3,3,4,4,5,5-octafluoropentyl benzoate, bis(2,2,2-trifluoroethyl)phthalate, 5-(perfluorobutyl)bicyclo[2.2.1]-2-heptene, 5-(perfluorobutyl)bicyclo[2.2.1]heptane, 1,1,2,2,3,3,4-heptafluorocyclopentane, 1,1,1,2,3,3-hexafluoro-4-(1,1,2,3,3,3-hexafluoropropoxy)pentane, 2,2,3,4,4,4-hexafluoro-1-butanol, 2,2,3,3,4,4,5,5-octafluoro-1-pentanol, 2,2-bis(trifluoromethyl)-1-propanol, 3,3,4,4,5,5,6,6-nonafluoro-1-hexanol, 2,3,3,3-tetrafluoro-2-(perfluoropropyloxy)-1-propanol, 4,4,5,5,6,6,7,7,7-nonafluoro-1-heptanol, 2,2,3,3,4,4,5,5,6,6,7,7-dodecafluoro-1-heptanol, 3,3,4,4,5,5,6,6,7,7,8,8-tridecafluoro-1-octanol, 7,7,8,8,8-pentafluoro-1-octanol, 4,4,5,5,6,6,7,7,8,8,9,9,9-tridecafluoro-1-nonanol, and 7,8,8,8-tetrafluoro-7-(trifluoromethyl)-1-octanol.

As the organic solvent (C), one type may be used alone, or two or more types may be used in combination. Further, a solvent mixture having another solvent mixed to the organic solvent (C) may be used so long as it can be used as a organic solvent (C) after the mixing. Further, a solvent mixture having two or more other solvents mixed to the organic solvent (C) may be used so long as it can be used as a organic solvent (C) after the mixing.

Specifically, the following combinations may be mentioned as solvent mixtures which can be used as the organic solvent (C).

TABLE 8

| Organic solvents | δd | δp | δh | R | |
|---|---|---|---|---|---|
| Pinacolin | 15.2 | 5.7 | 5.3 | 2.0 | calc |
| Benzonitrile | 18.8 | 12.0 | 3.3 | 79.1 | DB |
| 90/10 (volume ratio) | 15.6 | 6.3 | 5.1 | 1.1 | — |
| t-Butyl formate | 14.8 | 5.4 | 7.4 | 12.9 | calc |
| Acetophenone | 18.8 | 9.0 | 4.0 | 49.4 | DB |
| 71/29 (volume ratio) | 16.0 | 6.4 | 6.4 | 5.3 | — |
| t-Butyl acetate | 15.0 | 3.7 | 6.0 | 8.9 | DB |
| Cyclopentanone | 17.9 | 11.9 | 5.2 | 58.6 | DB |
| 76/24 (volume ratio) | 15.7 | 5.8 | 5.8 | 2.3 | — |
| Benzotrifluoride | 17.5 | 8.8 | 0.0 | 41.1 | DB |
| 1,4-Dioxane | 17.5 | 1.8 | 9.0 | 50.3 | DB |
| 54/46 (volume ratio) | 17.5 | 5.6 | 4.1 | 13.0 | — |
| Cyclohexanone | 17.8 | 8.4 | 5.1 | 25.6 | DB |
| Hexafluorobenzene | 16.0 | 0.0 | 0.0 | 51.3 | DB |
| 62/38 (volume ratio) | 17.1 | 5.2 | 3.2 | 9.6 | — | calc: calculated value,
DB: data base value

As the organic solvent (C), it is preferred to use an organic solvent, with which a temperature to exhibit a solution state with the fluorinated copolymer (A) is present also at a temperature of not higher than 230° C. When such a temperature range is present also at a temperature of not higher than 230° C., the after-described dissolution of the fluorinated copolymer (A) can be carried out at a sufficiently low temperature than the melting point of the fluorinated copolymer (A), whereby it is possible to prevent deterioration of the characteristics of the fluorinated copolymer (A).

As the organic solvent (C), with which the temperature range to exhibit a solution state with the fluorinated copolymer (A) is present also at a temperature of not higher than 230° C., i.e. which has a dissolution temperature of not higher than 230° C., the following solvents may be mentioned.

1,3-bis(trifluoromethyl)benzene (dissolution temperature: 140° C.)

Diisopropyl ketone (dissolution temperature: 150° C.)

2-Hexanone (dissolution temperature: 150° C.)

Cyclohexanone (dissolution temperature: 180° C.)

3',5'-bis(trifluoromethyl)acetophenone (dissolution temperature: 150° C.)

2',3',4',5',6'-Pentafluoroacetophenone (dissolution temperature: 150° C.)

Benzotrifluoride (dissolution temperature: 150° C.)

Isobutyl acetate (dissolution temperature: 150° C.)

Here, the dissolution temperature in brackets ( ) is a dissolution temperature in a case where the fluorinated copolymer (A) is fluorinated copolymer (A-1) in the following Examples.

The organic solvent (C) is preferably an organic solvent which is liquid at room temperature (25° C.) since it is used for a coating composition. Further, for the same reason, the melting point of the organic solvent (C) is preferably at most 20° C.

The boiling point (under ordinary pressure) of the organic solvent (C) is preferably at most 210° C., more preferably at most 200° C., particularly preferably at most 180° C., from the viewpoint of the handling efficiency of the organic solvent (C) and the removability of the organic solvent (C) in the after-mentioned step (V). Further, the boiling point (under ordinary pressure) of the organic solvent (C) is preferably at least 40° C., more preferably at least 50° C., particularly preferably at least 80° C., with a view to suppressing formation of bubbles in the after-mentioned step (V).

[Coating Composition]

In the coating composition, the content of the fluorinated copolymer (A) is preferably from 0.1 to 30 mass %, particularly preferably from 0.5 to 20 mass %, based on 100 mass % of the coating composition.

The amount of the charge aid (B) in the coating composition is preferably from 0.1 to 10 parts by mass, particularly preferably from 0.2 to 5 parts by mass, based on 100 parts by mass of the fluorinated copolymer (A). When the amount of the charge aid (B) is within the above range, the charge density of the obtainable charge retention medium will be higher, and the charge retention property will further be improved.

The content of the organic solvent (C) in the coating composition is preferably from 70 to 99.9 mass %, particularly preferably from 80 to 99.5 mass %, based on 100 mass % of the coating composition. When the content of the solvent (C) is within the above range, excellent handling efficiency and the like of the coating composition at the time of coating in production of a coating film can be obtained, and the obtainable coating film can be made homogeneous.

The moisture content contained in the organic solvent (C) to be used for preparation of the coating composition is preferably low, and is preferably at most 100 mass ppm, particularly preferably at most 20 mass ppm.

The solid content concentration of the coating composition may properly be set depending upon the film thickness to be formed. It is usually from 0.1 to 30 mass %, preferably from 0.5 to 20 mass %.

The solid content concentration is calculated by heating a coating composition of which the mass has already been measured, under normal pressure at 200° C. for one hour to distill the organic solvent (C) off, and measuring the mass of the remaining solid content.

The coating composition may contain a tetraalkoxysilane (such as tetramethoxysilane, tetraethoxysilane or tetrapropoxysilane). The content of the tetraalkoxysilane is preferably at most 10 mass %, particularly preferably at most 5 mass %, based on 100 mass % of the coating composition.

The coating composition may contain, as the case requires, other optional components within a range not to impair the effects of the present invention. As such other optional components, various additives may be mentioned including, for example, an antioxidant, a light stabilizer, an ultraviolet stabilizer, a crosslin king agent, a lubricant, a plasticizer, a thickening agent, a dispersion stabilizer, a bulking agent (filler), a reinforcing agent, a pigment, a dye, a flame retardant, etc. The content of such other optional components is preferably at most 30 mass %, particularly preferably at most 10 mass %, based on 100 mass % of the coating composition.

[Preferred Combination]

As a preferred combination of the respective components in the coating composition, in view of excellent surface charge and charge retention property (durability) of the obtainable charge retention medium, the following combinations may be mentioned.

Fluorinated copolymer (A): A fluorinated copolymer comprising TFE/ethylene/monomer having a reactive functional group (at least one member selected from the group consisting of a carboxylic acid group, an acid anhydride group and a carboxylic acid halide group) in a molar ratio of 65 to 40/35 to 60/0.01 to 5.

Charge aid (B): A silane coupling agent having an amino group, or at least one member selected from the group consisting of tris(2-aminoethyl)amine, tris(3-aminopropyl)amine, tris(4-aminobutyl)amine, tris(5-aminopentyl)amine and tris(6-aminohexyl)amine.

Organic solvent (C): At least one member selected from the group consisting of 1,3-bis(trifluoromethyl)benzene, diisopropylketone, 2-hexanone, cyclohexanone, 3',5'-bis(trifluoromethyl)acetophenone, 2',3',4',5',6'-pentafluoroacetophenone, benzotrifluoride and isobutyl acetate.

Particularly preferred combinations are as follows.

(Combination 1)

Fluorinated copolymer (A): A copolymer of TFE/ethylene/hexafluoropropylene/3,3,4,4,5,5,6,6,6-nonafluoro-1-hexene/itaconic anhydride, Charge aid (B): γ-aminopropylmethyldiethoxysilane, Organic solvent (C): 1,3-bis(trifluoromethyl)benzene.

(Combination 2)

Fluorinated copolymer (A): A copolymer of TFE/ethylene/hexafluoropropylene/3,3,4,4,5,5,6,6,6-nonafluoro-1-hexene/itaconic anhydride, Charge aid (B): N-(β-aminoethyl)-γ-aminopropylmethyldimethoxysilane, Organic solvent (C): 1,3-bis(trifluoromethyl)benzene.

(Combination 3)

Fluorinated copolymer (A): A copolymer of TFE/ethylene/hexafluoropropylene/3,3,4,4,5,5,6,6,6-nonafluoro-1-hexene/itaconic anhydride, Charge aid (B): N-(β-aminoethyl)-γ-aminopropyltriethoxysilane, Organic solvent (C): 1,3-bis(trifluoromethyl)benzene.

(Combination 4)

Fluorinated copolymer (A): A copolymer of TFE/ethylene/hexafluoropropylene/3,3,4,4,5,5,6,6,6-nonafluoro-1-hexene/itaconic anhydride, Charge aid (B): tris(2-aminoethyl)amine, Organic solvent (C): 1,3-bis(trifluoromethyl)benzene.

(Combination 5)

Fluorinated copolymer (A): A copolymer of TFE/ethylene/3,3,4,4,4-pentafluoro-1-butene/itaconic anhydride, Charge aid (B): N-(β-aminoethyl)-γ-aminopropylmethyldimethoxysilane, Organic solvent (C): 1,3-bis(trifluoromethyl)benzene.

(Combination 6)

Fluorinated copolymer (A): A copolymer of TFE/ethylene/3,3,4,4,4-pentafluoro-1-butene/itaconic anhydride, Charge aid (B): N-(β-aminoethyl)-γ-aminopropylmethyldimethoxysilane, Organic solvent (C): diisopropylketone.

(Combination 7)

Fluorinated copolymer (A): Dyneon (registered trademark) HTE 1705, manufactured by Dyneon (a copolymer of TFE, ethylene and hexafluoropropylene), Charge aid (B): N-(β-aminoethyl)-γ-aminopropylmethyldimethoxysilane, Organic solvent (C): 1,3-bis(trifluoromethyl)benzene.

<Process for Producing Charge Retention Medium>

The process for producing a charge retention medium of the present invention comprises applying a coating composition containing a fluorinated copolymer (A) having repeating units based on ethylene and repeating units based on tetrafluoroethylene, and an organic solvent (C), to a substrate to form a coating film.

The process for producing a charge retention medium of the present invention preferably comprises the following steps (I) to (VII) in this order in view of excellent surface charge and charge retention property (durability) of the obtainable charge retention medium.

(I) A step of dissolving the fluorinated copolymer (A) in the organic solvent (C) at a temperature of at least the dissolution temperature at which the fluorinated copolymer (A) is dissolved in the organic solvent (C) and at most the melting point of the fluorinated copolymer (A) to obtain a fluorinated copolymer solution.

(II) A step of cooling the fluorinated copolymer solution to a temperature less than the dissolution temperature to obtain a fluorinated copolymer dispersion (coating composition) having fine particles of the fluorinated copolymer (A) dispersed in the organic solvent (C).

(III) A step of mixing the fluorinated copolymer dispersion with a charge aid (B) to obtain a coating composition, as the case requires.

(IV) A step of applying the coating composition to a substrate to form a wet film (wet layer).

(V) A step of preliminarily drying the wet film at a temperature of at least 50° C. and less than 150° C., followed by baking at from 160 to 350° C. to form a coating film (precursor of the charge retention medium).

(VI) A step of forming another layer on the surface of the coating film, as the case requires.

(VII) A step of injecting electric charge into the coating film to obtain a charge retention medium, as the case requires.

Before, between and after the steps (I) to (VII), another step may be carried out so long as the respective steps are not affected.

(Step (I))

The temperature in the step (I) is at most the melting point of the fluorinated copolymer (A). Since the melting point of the fluorinated copolymer (A) is about 275° C. at the highest, the temperature at which the fluorinated copolymer (A) is dissolved in the organic solvent (C) is preferably at most about 275° C., and with a view to suppressing deterioration of the fluorinated copolymer (A), it is more preferably at most 230° C., particularly preferably at most 200° C. If the temperature in the step (I) exceeds 275° C., the operation may not readily be conducted in practice.

Further, the temperature in the step (I) is at least the above dissolution temperature, and is preferably at least 40° C., more preferably at least 60° C., and considering the operation efficiency and the like, particularly preferably at least 80° C. If the temperature in the step (I) is less than 40° C., no sufficient dissolved state may be obtained in some cases.

The pressure in the step (I) is usually preferably normal pressure or a slightly elevated pressure of about 0.5 MPa. In a case where the boiling point of the organic solvent (C) is lower than the temperature in the step (I), the fluorinated copolymer (A) may be dissolved in a pressure resistant container at least under a pressure of at most a spontaneous pressure, preferably at most 3 MPa, more preferably at most 2 MPa, further preferably at most 1 MPa, particularly preferably at most normal pressure, usually at a level of from 0.01 to 1 MPa.

The time for the step (I) depends on the content of the fluorinated copolymer (A), the form of the fluorinated copolymer (A) and the like, and is preferably from 0.1 to 8 hours, particularly preferably from 0.2 to 2 hours. If the time for the step (I) is at least the lower limit of the above range, a sufficient dissolved state will be obtained, and a time of at most the upper limit of the above range is efficient. The form of the fluorinated copolymer (A) is preferably powdery in view of the operation efficiency to shorten the dissolution time, and is preferably pellets in view of availability. In the case of a powdery form, the average particle size is preferably from 5 to 1,000 μm, particularly preferably from 5 to 700 μm. In the case of pellets, the shape is not particularly limited. In the case of cylindrical pellets, it is preferred that both the average length and the average diameter are from 0.5 to 30 mm, particularly preferably from 0.5 to 5 mm. The average length and the average diameter are values measured by a caliper.

The mixing means in the step (I) may be a known stirring and mixing machine such as a homomixer, a Henschel mixer, a Banbury mixer, a pressure kneader, or a single screw or twin screw extruder.

In the case of dissolution under pressure, an apparatus such as an autoclave provided with a stirrer may be used. The shape of a stirring blade may, for example, be a marine propeller blade, an paddle blade, an anchor blade or a turbine blade. In the case of small scale, a magnetic stirrer or the like may also be used.

In the step (I), mixing of the fluorinated copolymer (A) and the organic solvent (C) and heating may be carried out simultaneously, or the fluorinated copolymer (A) and the organic solvent (C) are mixed, followed by heating with stirring as the case requires.

(Step (II))

The fluorinated copolymer solution obtained in the step (I) is placed under conditions (usually at room temperature under normal pressure) under which the fluorinated copolymer (A) precipitates as microparticles in the organic solvent (C), whereby microparticles of the fluorinated copolymer (A) precipitate in the organic solvent (C), and a fluorinated copolymer dispersion having fine particles of the fluorinated copolymer (A) dispersed in the organic solvent (C) is obtained. Specifically, the fluorinated copolymer solution is cooled to a temperature of at most a temperature at which the fluorinated copolymer (A) precipitates as microparticles i.e. a temperature of less than the dissolution temperature, usually room temperature, whereby microparticles of the fluorinated copolymer (A) are precipitated in the organic solvent (C). The cooling manner may be slow cooling or rapid cooling. The cooling rate is preferably from 0.02 to 100° C./sec, particularly preferably from 0.1 to 20° C./sec. When the cooling rate is within the above range, microparticles of the fluorinated copolymer (A) having a preferred average particle size will be obtained.

The average particle size of the microparticles of the fluorinated copolymer (A) in the fluorinated copolymer dispersion is preferably from 0.005 to 2 μm, more preferably from 0.005 to 1 μm, particularly preferably from 0.01 to 0.5 μm. When the average particle size of the microparticles is within the above range, a homogeneous coating film excellent in the transparency, the flatness and the adhesion can be formed.

The average particle size of the microparticles of the fluorinated copolymer (A) is measured by a small-angle X-ray scattering method or a dynamic light scattering method at 20° C.

(Step (III))

In the step (III), the charge aid (B) and the fluorinated copolymer dispersion (coating composition) obtained in the step (II) may be mixed, or a charge aid solution having the charge aid (B) preliminarily dissolved in an organic solvent and the fluorinated copolymer dispersion may be mixed. However, the latter is preferred, whereby the fluorinated copolymer (A) and the charge aid (B) are readily mixed.

The organic solvent to dissolve the charge aid (B) is preferably the same as the organic solvent (C) to be used for the fluorinated copolymer dispersion.

The organic solvents may be used alone or in combination of two or more.

As a mixing means in the step (III), a known stirring and mixing machine such as a ball mill may be mentioned.

Further, for the purpose of more uniformly dispersing the microparticles of the fluorinated copolymer (A), a stirring and mixing machine which applies a high shear stress may also be used. Specifically, a stirring apparatus commonly used to stir a liquid while applying a high shearing force is preferred.

Here, the charge aid (B) may be added to the organic solvent (C) before the step (I), or may be added to the organic solvent (C) together with the fluorinated copolymer (A) in the step (I), however, in a case where the fluorinated copolymer (A) and the charge aid (B) coexist in the step (I), the fluorinated copolymer (A) and the charge aid (B) may react with each other by heating in the step (I), and uniform dispersion of the microparticles of the fluorinated copolymer (A) in the organic solvent (C) in the step (II) is impaired in some cases. Accordingly, it is preferred to mix the charge aid (B) and the fluorinated copolymer dispersion between the step (II) and the step (IV), i.e. in the step (III).

(Step (IV))

The coating method in the step (IV) is not particularly limited, and a commonly employed method may be employed.

The coating method may, for example, be a roll coater method, a casting method, a potting method, a dipping method, a spin coating method, a casting-on-water method, a Langmuir-Blodgett method, a die coating method, an ink jet method, a spray coating method, a relief printing method, a gravure printing method, a lithography method, a screen printing method or a flexographic printing method, and is properly selected depending upon the purpose of use of the charge retention medium, the substrate, required characteristics, and the like.

The state of the coating composition in the step (IV) may be a state where the fluorinated copolymer (A) is dissolved in the organic solvent (C), or the fluorinated copolymer (A) is dispersed in the organic solvent (C). In the present invention, the latter is preferred. That is, the latter is preferred from the viewpoint of the workability, since the fluorinated copolymer dispersion (coating composition) can be applied to the substrate at a temperature of less than the dissolution temperature at which the fluorinated copolymer (A) is dissolved in the organic solvent (C), and the organic solvent (C) can be removed at a relatively low temperature in the step (V). Further, by adjusting the coating temperature and the drying temperature to be low temperatures, a dense and flat coating film can be obtained without imposing a strain on the substrate and the materials.

The coating temperature in the step (IV) varies depending upon the coating composition, and is preferably from 0 to 210° C., more preferably from 0 to 130° C., particularly preferably from 0 to 50° C. When the coating temperature is at least the lower limit of the above range, the fluorinated copolymer (A) will be sufficiently dispersed, and when it is at most the upper limit of the above range, the organic solvent (C) is less likely to volatilize, and probability of bubbles and the like forming tends to be low.

The shape and the size of the wet film may properly be set depending upon the desired shape and size of the charge retention medium. In the case of an electret to be used for an electrostatic induction conversion device or for a piezoelectric device, the thickness of the electret is usually from 1 to 200 μm, and in view of the characteristics as an electret and the processability of the coating film, it is preferably from 10 to 20 μm. Accordingly, in order that the thickness of the coating film after the step (V) be from 1 to 200 μm, preferably from 10 to 20 μm, the thickness of the wet film should be from 2 to 220 μm, preferably from 12 to 25 μm. In the case of use for a surface member for a cleaning roller or a member for electrically-charged particles, the thickness of the coating film for the member is usually from 0.001 to 50 μm, and in view of the charge characteristics and the processability of the coating film, preferably from 0.01 to 10 μm. Accordingly, in order that the thickness of the coating film after the step (V) be from 0.001 to 50 μm, preferably from 0.01 to 10 μm, the thickness of the wet film should be from 0.0012 to 60 μm, preferably from 0.012 to 12 μm. In the case of use for a dust collection filter, the thickness of the filter is usually from 1 μm to 10 mm, and in view of the collection efficiency of the filter and the forming properties, preferably from 20 μm to 1 mm. Accordingly, in order that the thickness of the coating film after the step (V) be from 1 μm to 10 mm, preferably from 20 μm to 1 mm, the thickness of the wet film should be from 12 μm to 12 mm, preferably from 24 μm to 1.2 mm.

As the substrate, any substrate may be used which can be connected to earth when electric charge is injected into the formed coating film. The substrate may be one made of a metal (such as gold, platinum, copper, aluminum, chromium or nickel); or an electrically insulating material (such as an inorganic material such as glass; or an organic polymer material such as polyethylene terephthalate, polyimide, polycarbonate or an acrylic resin). On the surface of the substrate main body, a metal film may be formed e.g. by sputtering, vapor deposition or wet coating.

Further, a semiconductor material (such as silicon) may also be used so long as it is one having a metal film formed on its surface or the ohmic value of the semiconductor material itself is low.

The ohmic value of the substrate is preferably at most 0.1 Ωcm, particularly preferably at most 0.01 Ωcm, by volume resistivity.

The substrate may be a flat plate having a smooth surface or one having convexoconcave formed thereon. Otherwise, it may have patterning applied in various shapes. In a case where an insulating material is used as the substrate main body, a pattern or convexoconcave may be formed on the insulating material itself, or a pattern or convexoconcave may be formed on a metal film formed on the surface.

As a method for forming a pattern or convexoconcave on the substrate, a conventional method may be employed. The method for forming a pattern or convexoconcave may be either a vacuum process or a wet process. The vacuum process may, for example, be a sputtering method via a mask or a vapor deposition method via a mask. The wet process may, for example, be a roll coater method, a casting method, a dipping method, a spin coating method, a casting-on-water method, a Langmuir-Blodgett method, a die coating method, an ink jet method, a spray coating method, a relief printing method, a gravure printing method, a lithography method, a screen printing method or a flexographic printing method. Further, as a method for forming a fine pattern or convexoconcave, a nanoimprinting method or a photolithography method may, for example, be mentioned.

To the surface of the substrate, a pretreatment may be applied for the purpose of improving the adhesion between the substrate and the coating film. The pretreatment method may be a method of applying e.g. polyethyleneimine to the substrate, a method of physically treating the surface e.g. by sandblasting, or a method of chemically treating the surface e.g. by corona discharge.

(Step (V))

In the preliminary drying, the organic solvent (C) in the wet film is made to fly as far as possible to preliminarily dry the wet film. By preliminary drying, foaming, surface roughening, non-uniformity and the like of the coating film at the time of baking can be suppressed.

The preliminary drying temperature is preferably at most the boiling point of the organic solvent (C), and specifically, preferably at least 50° C. and less than 150° C., particularly preferably from 80 to 120° C.

The preliminary drying time is preferably from 0.1 to 5 hours, particularly preferably from 0.5 to 2 hours.

The baking temperature is preferably from 160 to 350° C., more preferably from 230 to 350° C., further preferably from 230 to 300° C., particularly preferably from 240 to 280° C. When the baking temperature is within the above range, crystals of the fluorinated copolymer (A) tend to be more highly ordered (high ordering of crystals) by cooling after the baking, and the charge aid (B) is included in the amorphous portion present between crystals in the fluorinated copolymer (A) and is thereby dispersed at the nano-order level. Thus, a charge retention medium having a sufficient surface potential and excellent in the thermal stability can be obtained. Further, when the baking temperature is at least the lower limit of the above range, formation of an imide bond or an amide bond between each reactive functional group (carboxylic acid group, acid anhydride group or carboxylic acid halide group) of the fluorinated copolymer (A) and an amino group of the charge aid (B) will be accelerated, and the obtainable charge retention medium is excellent in the thermal stability. If the baking temperature is at least the upper limit of the above range, decomposition of the charge aid (B) may occur, and accordingly it is preferred to carry out baking at a temperature of at most the upper limit.

The baking time is preferably from 0.5 to 5 hours, particularly preferably from 1 to 2 hours. When the baking time is within the above range, the amount of remaining solvent can be made small.

The atmosphere at the time of baking may be either in an inert gas or in the air, and is preferably in the air, whereby when the charge aid (B) has the above-described hydrolyzable silyl group or silanol group, its hydrolytic condensation is accelerated. Here, "in an inert gas" means "in the air containing at least 99 vol % of at least one inert gas selected from the group consisting of a nitrogen gas and noble gases such as a helium gas and an argon gas.

The pressure at the time of baking is preferably normal pressure.

The thickness of the obtainable coating film can be freely selected depending upon the purpose. A thick coating film can be obtained by using a coating composition having a high concentration, and a thin coating film can be obtained by using a coating composition having a low concentration. Further, by repeatedly carrying out the step (IV) several times, a thicker coating film will be obtained.

After the wet film is preliminarily dried and baked, cooling is carried out to room temperature. Cooling may be either slow cooling or rapid cooling, and slow cooling is preferred. The cooling rate is preferably from 5° C./min to 10° C./min. Cooling may be carried out by using an apparatus or by natural cooling by leaving the wet film, and is preferably carried out by using an apparatus with a view to stabilizing the state (surface smoothness, film thickness uniformity, and the like) of the coating film.

The coating film obtained in the step (V) may be separated from the substrate and used as a film by itself.

(Step (VI))

As the case requires, another layer may be laminated on the surface of the coating film obtained in the step (V). Such another layer which may be laminated may, for example, be a protective layer, a layer consisting solely of the fluorinated copolymer (A), a layer comprising a fluorinated copolymer other than the fluorinated copolymer (A), or a layer comprising an inorganic substance.

Such another layer may be formed on the surface of the coating film after baking, or may be formed between preliminary drying and baking, and baked together with the preliminarily dried wet film.

(Step (VII))

As a method of injecting electric charge into the coating film, a conventional method to charge an insulator may be mentioned. For example, a corona discharge method ("Electrets Third Edition", G. M. Sessler, Laplacian Press, 1998, p. 20, Chapter 2.2, "Charging and Polarizing Methods"), an electron beam bombardment method, an ion beam bombardment method, a radiation method, a light irradiation method, a contact charging method or a liquid contact charging method. In the case of an electret, a corona discharge method or an electron beam bombardment method is preferred.

The temperature at the time of injecting electric charge is preferably at least the glass transition temperature of the fluorinated copolymer (A) in view of the stability of electric charge maintained after the injection, and is more preferably a temperature of about the glass transition temperature + from 10 to 20° C.

The voltage to be applied at the time of injecting electric charge is preferably as high as possible so long as it is lower than the dielectric breakage voltage of the coating film. In the case of the coating film in the present invention, a high voltage of from ±6 to ±30 kV is applicable, and a voltage of from ±8 to ±15 kV is preferred. The fluorinated copolymer (A) constituting the coating film is capable of maintaining a negative electric charge more stably than a positive electric charge, and accordingly, a voltage of from −8 to −15 kV is particularly preferred.

The charge retention medium obtained by injecting electric charge to the coating film may be removed from the substrate and then used as a film-form charge retention medium for e.g. an electrostatic induction conversion device, or may be used as provided on the surface of the substrate for e.g. an electrostatic induction conversion device.

(Function and Effects)

By the above-described process for producing a charge retention medium of the present invention, since a coating composition containing the fluorinated copolymer (A) and the organic solvent (C) is applied to a substrate to form a coating film (precursor of the charge retention medium), a coating film containing the fluorinated copolymer (A) can easily be formed on the surface of a substrate, even in a case where the surface of the substrate has a complicated shape.

EXAMPLES

Now, the present invention will be described in further detail with reference to Examples. However, it should be understood that the present invention is by no means restricted to such specific Examples.

Example 1 to 5, 11 to 14, 21 to 26, 31 to 34 and 41 to 43 are Examples of the present invention, and Example 51 is a Comparative Example.

(Fluorinated Copolymer (A))

Fluorinated copolymer (A-1): ETFE (molar ratio of repeating units: TFE/ethylene/hexafluoropropylene/3,3,4,4,5,5,6,6,6-nonafluoro-1-hexene/itaconic anhydride=47.7/42.5/8.4/1.2/0.2, melting point: 188° C., Q value: 9.5 mm$^3$/sec, glass transition temperature: 52° C.).

Fluorinated copolymer (A-2): ETFE (molar ratio of repeating units: TFE/ethylene/3,3,4,4,4-pentafluoro-1-butene/itaconic anhydride=57.5/39.9/2.3/0.3, melting point: 240° C., Q value: 15 to 30 mm$^3$/sec, glass transition temperature: 87° C.).

Fluorinated copolymer (A-3): Dyneon (registered trademark) HTE 1705, manufactured by Dyneon (copolymer of TFE, ethylene and hexafluoropropylene, melting point: 210° C.).

(Charge Aid (B))

Compound (B1-1): γ-aminopropylmethyldiethoxysilane (manufactured by Shin-Etsu Chemical Co., Ltd.)

Compound (B1-2): N-(β-aminoethyl)-γ-aminopropylmethyldimethoxysilane (manufactured by Shin-Etsu Chemical Co., Ltd.)

Compound (B1-3): N-(β-aminoethyl)-γ-aminopropyltriethoxysilane (manufactured by Shin-Etsu Chemical Co., Ltd.)

Compound (B2-1): tris(2-aminoethyl)amine (manufactured by Tokyo Chemical Industry Co., Ltd.)

(Organic Solvent (C))

Organic solvent (C-1): 1,3-bis(trifluoromethyl)benzene (manufactured by Tokyo Chemical Industry Co., Ltd.), dissolution index (R): 26.5, dissolution temperature (fluorinated copolymer (A-1)): 140° C., dissolution temperature (fluorinated copolymer (A-2)): 185° C., dissolution temperature (fluorinated copolymer (A-3)): 200° C., boiling point (normal pressure): 116° C.).

Organic solvent (C-2): diisopropylketone (manufactured by Tokyo Chemical Industry Co., Ltd., dissolution index (R): 0, dissolution temperature (fluorinated copolymer (A-1)): 140° C., dissolution temperature (fluorinated copolymer (A-2)): 185° C., dissolution temperature (fluorinated copolymer (A-3)): 200° C., boiling point (normal pressure): 125° C.).

Example 1

Step (I))

Into a pressure resistant reactor made of borosilicate glass, 320 mg of fluorinated copolymer (A-1) and 15.68 g of organic solvent (C-1) were put, and heated to 140° C. with stirring, whereupon a uniform and transparent fluorinated copolymer solution was obtained. Heating was carried out for 0.3 hour.

Step (II))

The fluorinated copolymer solution was gradually cooled to room temperature, whereupon a uniform fluorinated copolymer dispersion without precipitate was obtained. The cooling time was 0.3 hour.

Step (III))

0.3 g of compound (B1-1) was dissolved in 9.7 g of organic solvent (C-1) to obtain a charge aid solution.

16.00 g of the fluorinated copolymer dispersion obtained in the step (II) and 0.32 g of the charge aid solution were mixed to obtain a uniform coating composition.

Step (IV))

A copper substrate (3 cm square, thickness: 300 μm) was coated with the coating composition by a potting method.

Step (V))

The resulting wet film was preliminarily dried by Clean Oven DT610 manufactured by YAMATO SCIENTIFIC CO., LTD. at 100° C. for one hour, and then baked in the same oven at 280° C. for one hour to form a coating film having a thickness of 15 μm.

Step (VII))

To the obtained coating film, electric charge was injected by using a corona charging equipment shown in FIG. 1 to obtain an electret in Example 1.

The corona charging equipment has such a structure that by using a first substrate 10 (copper substrate) having a coating film 32 formed thereon as an electrode, a high voltage can be applied between a corona needle 44 and the first substrate 10 by a DC high voltage power source 42 (HAR-20R5, manufactured by Matsusada Precision Inc.). Further, to a grid 46, a grid voltage can be applied from a power source 48 for grid. Thus, negative ions discharged from the corona needle 44 are homogenized by the grid 46 and then showered down on the coating film 32, whereby electric charge is injected.

Further, to stabilize electric charge injected to the coating film 32, it is designed so that the coating film 32 during injection of electric charge can be heated to a temperature of at least the glass transition temperature by a hot plate 50. The reference symbol 40 represents an ammeter.

In Example 1, the heating temperature of the coating film 32 by the hot plate 50 was set to be 120° C. which is higher by 68° C. than the glass transition temperature of fluorinated copolymer (A-1).

Then, in the air, a high voltage of −8 kV was applied between the corona needle 44 and the first substrate 10 for 3 minutes. During the application, the grid voltage was −1,200 V.

(Measurement of Surface Potential)

Figure 2:
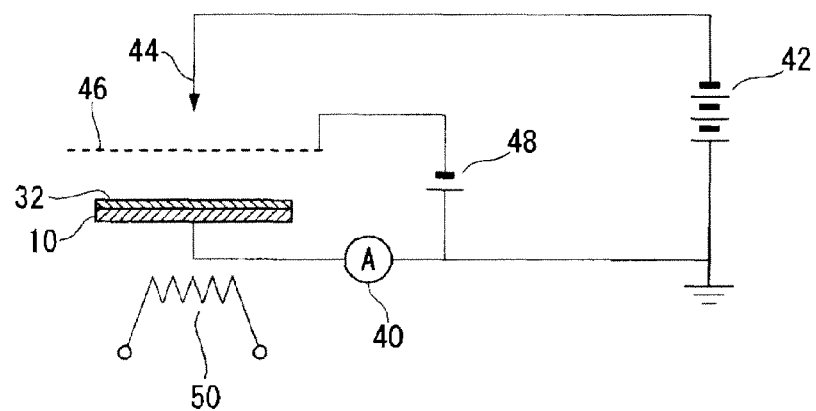
FIG. 2 is a view schematically illustrating a corona charging equipment used for injection of electric charge.

With respect to the electret, the following respective surface potentials were measured. The results are shown in Table 9. Each surface potential was obtained by measuring surface potentials at 9 measuring points (set in a lattice arrangement for every 3 mm from the center of the film, as shown in FIG. 2) of the electret by using a surface electrometer (model 279, manufactured by Monroe Electronics Inc.), and taking their average value.

Initial surface potential: The surface potential when the electret immediately after injection of electric charge by corona charging was recovered to room temperature (25° C.).

Surface potential after 200 hours: The surface potential when the electret after measurement of the initial surface potential was stored at 20° C. under 60% RH for 200 hours and then recovered to room temperature.

(TSD Test)

Figure 3:
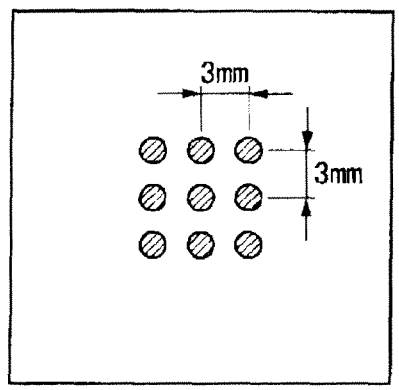
FIG. 3 is a diagram showing set positions for measuring points for surface potential.
Figure 4:
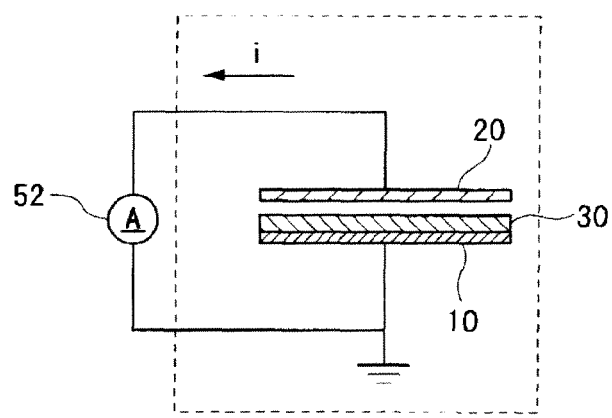
FIG. 4 is a view schematically illustrating an apparatus used in a thermal stability test.

With respect to an electret of which the surface potential before TSD test was measured, a TSD test was carried out by using an apparatus as shown in FIG. 3 by the following procedure.

First, as shown in FIG. 3, a second substrate 20 to be a counter electrode was disposed to face the electret 30 on the first substrate 10 (copper substrate).

Then, the temperature at a portion indicated by a broken line in FIG. 3 was increased at a constant rate (1° C./min) by heating by a heater, and the capacity of charge discharged from the electret 30 was measured by an ammeter 52 (Microammeter, Model 6517A manufactured by Keithley Instruments) as a current value which flowed from the second substrate 20 to determine the discharge starting temperature and the discharge peak temperature. The results are shown in Table 9.

Here, the discharge peak temperature means a temperature at which the current value detected at the time of discharge reaches a maximum, and the discharge starting temperature means a temperature at which the current value (the current value at the time of start of discharge) obtained by the following formula (2) was detected by the ammeter 52.

Current value at the start of discharge={(current value at the discharge peak temperature)−(current value before discharge)}×0.1+(current value before discharge)  (2)

The TSD Test is a test by a method called a thermal stimulated discharge method (hereinafter referred to as TSD method). In this method, formation of a capacitor was permitted by the electret 30 and the second substrate 20 (counter electrode). Thus, when the electret 30 is heated, electric charge trapped in the film becomes unstable, and when electric charge in the vicinity of the surface disappears e.g. by diffusion, electric charge accumulated in the second substrate 20 also reduces. Accordingly, by measuring the current value which flows from the second substrate 20, thermal stability of the electret 30 can be evaluated.

In the test by the TSD method, both of the discharge peak temperature and the discharge starting temperature are important, and the discharge starting temperature is particularly important. The higher these temperatures, the higher the thermal stability of the electret.

Example 2

An electret was obtained in the same manner as in Example 1 except that the grid voltage in the step (VII) was as identified in Table 9. The results are shown in Table 9.

Example 3

An electret was obtained in the same manner as in Example 1 except that no charge aid (B) was used. The results are shown in Table 9.

Examples 4 and 5

An electret was obtained in the same manner as in Example 1 except that compound (B1-1) was changed to compound (B1-3), and the baking temperature in the step (V) and the grid voltage in the step (VII) were as identified in Table 9. The results are shown in Table 9.

Examples 11 to 14

An electret was obtained in the same manner as in Example 1 except that compound (B1-1) was changed to compound (B2-1), and the baking temperature in the step (V) and the grid voltage in the step (VII) were as identified in Table 10. The results are shown in Table 10.

Examples 21 to 26

An electret was obtained in the same manner as in Example 1 except that compound (B1-1) was changed to compound (B1-2), the amount of charge aid (B) was changed as identified in Table 11, and the grid voltage in the step (VII) was as identified in Table 11. The results are shown in Table 11.

Examples 31 to 34

An electret was obtained in the same manner as in Example 1 except that compound (B1-1) was changed to compound (B1-2), and the baking temperature in the step (V) was as identified in Table 12. The results are shown in Table 12.

Example 41

An electret was obtained in the same manner as in Example 1 except that fluorinated copolymer (A-1) was changed to fluorinated copolymer (A-2), the temperature in the step (I) was 185° C., compound (B1-1) was changed to compound (B1-2), and the baking temperature in the step (V) and the grid voltage in the step (VII) were as identified in Table 13. The results are shown in Table 13.

Example 42

An electret was obtained in the same manner as in Example 41 except that fluorinated copolymer (A-2) was changed to fluorinated copolymer (A-3), and the temperature in the step (I) was 200° C. The results are shown in Table 13.

Example 43

An electret was obtained in the same manner as in Example 41 except that the content of the fluorinated copolymer was changed, and the organic solvent (C-1) was changed to organic solvent (C-2). The results are shown in Table 13.

Example 51

Fluorinated copolymer (A-3) was formed into a film having a thickness of 24 μm by a hot press machine (SA-301, manufactured by TESTER SANGYO CO., LTD.) under conditions at a temperature of 250° C. under a pressure of 10 MPa for a time of 5 minutes. The film was contact-bonded to a copper substrate (3 cm square, thickness: 300 μm) by the above hot press machine under conditions at a temperature of 250° C. under a pressure of 10 MPa for a time of 5 minutes. However, the film was immediately peeled from the copper substrate, and no electret could be obtained.

TABLE 9

|  |  | Ex. 1 | Ex. 2 | Ex. 3 | Ex. 4 | Ex. 5 |
|---|---|---|---|---|---|---|
| (A) | Type | A-1 | A-1 | A-1 | A-1 | A-1 |
|  | Content [mass %/coating composition] | 2 | 2 | 2 | 2 | 2 |
| (B) | Type | B1-1 | B1-1 | Nil | B1-3 | B1-1 |
|  | Addition amount [parts by mass/(A)100 parts by mass] | 3 | 3 | — | 3 | 3 |
| (C) | Type | C-1 | C-1 | C-1 | C-1 | C-1 |
|  | Content [mass %/coating composition] | 98 | 98 | 98 | 98 | 98 |
| Baking temperature [° C.] | | 280 | 280 | 280 | 280 | 280 |
| Grid voltage [V] | | −1,200 | −2,000 | −1,200 | −1,200 | −2,000 |
| Initial surface potential [V] | | −935 | −1,407 | −565 | −989 | −1,446 |
| Surface potential after 200 hours [V] | | −912 | −1,305 | −325 | −972 | −1,048 |
| Discharge starting temperature [° C.] | | 81 | | 68 | 95 | |
| Discharge peak temperature [° C.] | | 127 | | 103 | 140 | |

TABLE 10

|  |  | Ex. 11 | Ex. 12 | Ex. 13 | Ex. 14 |
|---|---|---|---|---|---|
| (A) | Type | A-1 | A-1 | A-1 | A-1 |
|  | Content [mass %/coating composition] | 2 | 2 | 2 | 2 |
| (B) | Type | B2-1 | B2-1 | B2-1 | B2-1 |
|  | Addition amount [parts by mass/(A)100 parts by mass] | 3 | 3 | 3 | 3 |
| (C) | Type | C-1 | C-1 | C-1 | C-1 |
|  | Content [mass %/coating composition] | 98 | 98 | 98 | 98 |
| Baking temperature [° C.] | | 230 | 230 | 280 | 280 |
| Grid voltage [V] | | −1,200 | −2,000 | −1,200 | −2,000 |
| Initial surface potential [V] | | −934 | −1,299 | −1,087 | −1,509 |
| Surface potential after 200 hours [V] | | −920 | −1,271 | −1,058 | −1,417 |
| Discharge starting temperature [° C.] | | | | 89 | |
| Discharge peak temperature [° C.] | | | | 128 | |

TABLE 11

|  |  | Ex. 21 | Ex. 22 | Ex. 23 | Ex. 24 | Ex. 25 | Ex. 26 |
|---|---|---|---|---|---|---|---|
| (A) | Type | A-1 | A-1 | A-1 | A-1 | A-1 | A-1 |
|  | Content [mass %/coating composition] | 2 | 2 | 2 | 2 | 2 | 2 |
| (B) | Type | B1-2 | B1-2 | B1-2 | B1-2 | B1-2 | B1-2 |
|  | Addition amount [parts by mass/(A)100 parts by mass] | 1 | 3 | 9 | 1 | 3 | 9 |
| (C) | Type | C-1 | C-1 | C-1 | C-1 | C-1 | C-1 |
|  | Content [mass %/coating composition] | 98 | 98 | 98 | 98 | 98 | 98 |
| Baking temperature [° C.] | | 280 | 280 | 280 | 280 | 280 | 280 |
| Grid voltage [V] | | −1,200 | −1,200 | −1,200 | −2,000 | −2,000 | −2,000 |
| Initial surface potential [V] | | −1,008 | −1,067 | −1,073 | −1,446 | −1,492 | −1,522 |
| Surface potential after 200 hours [V] | | −989 | −1,043 | −986 | −1,368 | −1,461 | −1,264 |

TABLE 12

|  |  | Ex. 31 | Ex. 32 | Ex. 33 | Ex. 34 | Ex. 22 |
|---|---|---|---|---|---|---|
| (A) | Type | A-1 | A-1 | A-1 | A-1 | A-1 |
|  | Content [mass %/coating composition] | 2 | 2 | 2 | 2 | 2 |
| (B) | Type | B1-2 | B1-2 | B1-2 | B1-2 | B1-2 |
|  | Addition amount [parts by mass/(A)100 parts by mass] | 3 | 3 | 3 | 3 | 3 |
| (C) | Type | C-1 | C-1 | C-1 | C-1 | C-1 |
|  | Content [mass %/coating composition] | 98 | 98 | 98 | 98 | 98 |
| Baking temperature [° C.] | | 220 | 230 | 240 | 260 | 280 |
| Grid voltage [V] | | −1,200 | −1,200 | −1,200 | −1,200 | −1,200 |
| Initial surface potential [V] | | −652 | −804 | −998 | −997 | −1,067 |
| Surface potential after 200 hours [V] | | −615 | −754 | −979 | −957 | −1,043 |
| Discharge starting temperature [° C.] | | 74 | 76 | 81 | 85 | 90 |
| Discharge peak temperature [° C.] | | 105 | 108 | 113 | 127 | 132 |

TABLE 13

|  |  | Ex. 41 | Ex. 42 | Ex. 43 |
|---|---|---|---|---|
| (A) | Type | A-2 | A-3 | A-2 |
|  | Content [mass %/coating composition] | 2 | 2 | 6 |
| (B) | Type | B1-2 | B1-2 | B1-2 |
|  | Addition amount [parts by mass/(A)100 parts by mass] | 3 | 3 | 3 |
| (C) | Type | C-1 | C-1 | C-2 |
|  | Content [mass %/coating composition] | 98 | 98 | 94 |
| Baking temperature [° C.] |  | 280 | 280 | 280 |
| Grid voltage [V] |  | −1,200 | −1,200 | −1,200 |
| Initial surface potential [V] |  | −858 | −742 | −1,156 |
| Surface potential after 200 hours [V] |  | −841 | −669 | −1,003 |
| Discharge starting temperature [° C.] |  | 83 | 108 | 99 |
| Discharge peak temperature [° C.] |  | 110 | 166 | 147 |

It was confirmed that a suitable electret could be produced by the production process of the present invention. Whereas, in Example 51, an electret could not be produced since a formed film without using the coating composition of the present invention was used.

Particularly in Examples 1, 2, 4, 5, 11 to 14, 21 to 26, 31 to 34 and 41 to 43, both the charge retention performance (initial surface potential and surface potential after 200 hours) and the thermal stability (TSD discharge starting temperature and discharge peak temperature) were excellent. This is considered to be because the charge aid (B) was contained.

Examples 11 and 13, and Examples 12 and 14, are Examples in which the baking temperatures were 230° C. and 280° C., respectively. It was confirmed that the initial surface potential and the charge retention performance were better in Examples in which the firing temperature was 280° C. and higher. This is because the above-described high ordering of crystals highly proceeded by the increase of the baking temperature, and the charge aid (B) was more uniformly dispersed. The same tendency was confirmed in Examples 31 to 34 and 22.

Examples 41 and 42 are different from each other in the presence or absence of reactive functional groups in the fluorinated copolymer (A). Since the initial surface potential is better in Example 41, it is considered that the charge aid (B) and the reactive functional groups in the fluorinated copolymer (A) were bonded.

INDUSTRIAL APPLICABILITY

The charge retention medium obtainable by the production process of the present invention is useful as e.g. an electret to be used for an electrostatic induction conversion device (such as a power generation device, a microphone, a speaker, an actuator or a sensor), a surface member of a cleaning roller to be used for an image forming apparatus (such as a copying machine or a printer), a member for particles for image display to be used for an image display device such as electronic paper, a piezoelectric electret film which, in a printing machine in which an inking roller is pressed against a printing plate, measures the pressing of the inking roller against the printing plate, or a dust collection filter.

This application is a continuation of PCT Application No. PCT/JP2011/077986, filed on Dec. 2, 2011, which is based upon and claims the benefit of priority from Japanese Patent Application No. 2010-270651 filed on Dec. 3, 2010. The contents of those applications are incorporated herein by reference in its entirety.

REFERENCE SYMBOLS

1: Electrostatic induction power generation device
10: First substrate
12: Substrate main body
14: Base electrode
20: Second substrate
22: Substrate main body
24: Counter electrode
30: Electret
32: Coating film
40: Ammeter
42: DC high-voltage power source
44: Corona needle
46: Grid
48: Power source for grid
50: Hot plate
52: Ammeter

What is claimed is:

1. A process for producing a charge retention medium, which comprises
a step of applying a coating composition containing a fluorinated copolymer (A) having repeating units based on tetrafluoroethylene and repeating units based on ethylene, and an organic solvent (C), to a substrate to form a coating film
and the following steps (I), (II), (IV) and (V) in this order:
(I) a step of dissolving the fluorinated copolymer (A) in the organic solvent (C) at a temperature of at least the dissolution temperature at which the fluorinated copolymer (A) is dissolved in the organic solvent (C) and at most the melting point of the fluorinated copolymer (A) to obtain a fluorinated copolymer solution;
(II) a step of cooling the fluorinated copolymer solution to a temperature of less than the dissolution temperature to obtain the coating composition having microparticles of the fluorinated copolymer (A) dispersed in the organic solvent (C);
(IV) a step of applying the coating composition to the substrate to form a wet film; and
(V) a step of preliminarily drying the wet film at a temperature of at least 50° C. and less than 150° C., followed by baking at from 230 to 350° C. to form the coating film,
wherein the organic solvent (C) is selected from the group consisting of:
Methyl ethyl ketone,
2-Pentanone,
Methyl isopropyl ketone,
2-Hexanone,
Methyl isobutyl ketone,
Pinacolin,
2-Heptanone,
4-Heptanone,
Diisopropyl ketone,
Isoamyl methyl ketone,
2-Octanone,
2-Nonanone,
Diisobutyl ketone,
2-Decanone,
2-Methylcyclohexanone,
3-Methylcyclohexanone,
4-Ethylcyclohexanone,
2,6-Dimethylcyclohexanone,
3,3,5-Trimethylcyclohexanone,
4-tert-butylcyclohexanone, Cycloheptanone,
Isophorone,
(-)-Fenchone,
Ethyl formate,
Propyl formate,
Isopropyl fortmate,
Butyl formate,
Isobutyl formate,
sec-Butyl formate,
t-Butyl formate,
Amyl formate,
Isoamyl formate,
Hexyl formate,
Cyclohexyl formate,
Heptyl formate,
Octyl formate,
2-Ethylhexyl formate,
Nonyl formate,
Methyl acetate,
Propyl acetate,
Isopropyl acetate,
Isobutyl acetate,
sec-Butyl acetate,
t-Butyl acetate,
Amyl acetate,
Isoamyl acetate,
Hexyl acetate,
Cyclohexyl acetate,
Heptyl acetate,
Octyl acetate,
2-Ethylhexyl acetate,
2,2,2-Trifluoroethyl acetate,
2,2,3,3-Tetrafluoropropyl acetate,
2,2,3,3,3-Pentafluoropropyl acetate,
1,1,1,3,3,3-Hexafluoro-2-propyl acetate,
2,2-Bis(trifluoromethyl)propyl acetate,
2,2,3,3,4,4,4-Heptafluorobutyl acetate,
2,2,3,4,4,4-Hexafluorobutyl acetate,
2,2,3,3,4,4,5,5-Nonafluoropentyl acetate,
2,2,3,3,4,4,5,5-Octafluoropentyl acetate,
3,3,4,4,5,5,6,6-Nonafluorohexyl acetate,
4,4,5,5,6,6,7,7-Nonafluoroheptyl acetate,
2,2,3,3,4,4,5,5,6,6,7,7-Dodecafluoroheptyl acetate,
7,7,8,8,8-Pentafluorooctyl acetate,
3,3,4,4,5,5,6,6,7,7,8,8,8-Tridecafluoro-octyl acetate,
Methyl propionate,
Ethyl propionate,
Propyl propionate,
Isopropyl propionate,
Butyl propionate,
Isobutyl propionate,
sec-Butyl propionate,
t-Butyl propionate,
Amyl propionate,
Isoamyl propionate,
Hexyl propionate,
Cyclohexyl propionate,
Heptyl propionate,
Methyl butyrate,
Ethyl butyrate,
Propyl butyrate,
Isopropyl butyrate,
Butyl butyrate,
Isobutyl butyrate,
sec-Butyl butyrate,
t-Butyl butyrate,
Amyl butyrate,
Isoamyl butyrate,
Hexyl butyrate,
Cyclohexyl butyrate,
Methyl isobutyrate,
Ethyl isobutyrate,
Propyl isobutyrate,
Isopropyl isobutyrate,
Butyl isobutyrate,
Isobutyl isobutyrate,
sec-Butyl isobutyrate,
t-Butyl isobutyrate,
Amyl isobutyrate,
Isoamyl isobutyrate,
Hexyl isobutyrate,
Cyclohexyl isobutyrate,
Methyl valerate,
Ethyl valerate,
Propyl valerate,
Isopropyl valerate,
Butyl valerate,
Isobutyl valerate,
see-Butyl valerate,
t-Butyl valerate,
Amyl valerate,
Isoamyl valerate,
Methyl isovalerate,
Ethyl isovalerate,
Propyl isovalerate,
Isopropyl isovalerate,
Butyl isovalerate,
Isobutyl isovalerate,
sec-Butyl isovalerate,
t-Butyl isovalerate,
Amyl isovalerate,
Isoamyl isovalerate,
Methyl hexanoate,
Ethyl hexanoate,
Propyl hexanoate,
Isopropyl hexanoate,
Butyl hexanoate,
Isobutyl hexanoate,
sec-Butyl hexanoate,
t-Butyl hexanoate,
Methyl heptanoate,
Ethyl heptanoate,
Propyl heptanoate,
Isopropyl heptanoate,
Methyl octanoate,
Ethyl octanoate,
Methyl nonanoate,
Methyl cyclohexanecarboxylate,
Ethyl cyclohexanecarboxylate,
Propyl cyclohexanecarboxylate,
Isopropyl cyclohexanecarboxylate,
2,2,2-Trifluoroethyl cyclohexane- carboxylate,
Bis(2,2,2-trifluoroethyl) succinate,
Bis(2,2,2-trifluoroethyl) glutarate,
Bis(2,2,2-trifluoroethyl) adipate,
Methyl trifluoroacetate,
Ethyl trifluoroacetate,
Propyl trifluoroacetate,
Isopropyl trifluoroacetate,
Butyl trifluoroacetate,
Isobutyl trifluoroacetate,
sec-Butyl trifluoroacetate,
t-Butyl trifluoroacetate,
Amyl trifluoroacetate, Isoamyl trifluoroacetate,
Hexyl trifluoracetate,
Cyclohexyl trifluoroacetate,
Heptyl trifluoroacetate,
Octyl trifluoroacetate,
2-Ethylhexyl trifluoroacetate,
Methyl difluoroacetate,
Ethyl difluoroacetate,
Methyl perfluoropropionate,
Ethyl perfluoropropionate,
Methyl perfluorobutanoate,
Ethyl perfluorobutanoate,
Methyl perfluoropentanoate,
Ethyl perfluoropentanoate,
Methyl 2,2,3,3,4,4,5,5-octafluoro- pentanoate,
Ethyl 2,2,3,3,4,4,5,5-octafluoro pentanoate,
Methyl perfluoroheptanoate,
Ethyl perfluoroheptanoate,
Methyl 2,2,3,3,4,4,5,5,6,6,7,7- dodecafluoroheptanoate,
Ethyl 2,2,3,3,4,4,5,5,6,6,7,7-dodecafluoroheptanoate,
Methyl 2-trifluoromethyl-3,3,3-trifluoropropionate,
Ethyl 2-trifluoromrthyl-3,3,3-trifluoropropionate,
2-Ethoxyethyl acetate,
2-Propoxyethyl acetate,
2-Butoxyethyl acetate,
2-Pentyloxyethyl acetate,
2-Hexyloxyethyl acetate,
1-Methoxy-2-acetoxypropane,
1-Ethoxy-2-acetoxypropane,
1-Propoxy-2-acetoxypropane,
1-Butoxy-2-acetoxypropane,
1-Pentyloxy-2-acetoxypropane,
3-Methoxybutyl acetate,
3-Ethoxybutyl acetate,
3-Propoxybutyl acetate,
3-Butoxybutyl acetate,
3-Methoxy-3-methylbutyl acetate,
3-Ethoxy-3-methylbutyl acetate,
3-Propoxy-3-methylbutyl acetate,
4-Methoxybutyl acetate,
4-Ethoxybutyl acetate,
4-Propoxybutyl acetate,
4-Butoxybutyl acetate,
2-(Perfluoropropyloxy)-2,3,3,3- tetrafluoropropyl acetate,
Dimethyl carbonate,
Ethylmethyl carbonate,
Diethyl carbonate,
Dibutyl carbonate,
Dibutyl carbonate,
Bis(2,2,2-trifluoroethyl) carbonate,
Bis(2,2,3,3-tetrafluoropropyl) carbonate,
Tetrahydrofuran,
Butyronitrile,
Isobutyronitrile,
Valeronitrile,
Isovaleronitrile,
Capronitrile,
Isocapronitrile,
Heptanenitrile,
Octanenitrile,
Nonanenitrile,
Decanenitrile,
5-(Perfluorobutyl)bicyclo[2,2,1]-2-heptene,
5-(Perfluorohexyl)bicyclo[2,2,1]-2- heptene,
5-(Perfluorobutyl)bicyclo[2,2,1]heptane,
5-(Perfluorohexyl)bicyclo[2,2,1]heptane,
HFC-c447ef(1,1,2,2,3,3,4- heptafluorocyclopentane),
1,1,1,2,3,3-Hexafluoro-4-(1,1,2,3,3,3- hexafluoropropoxy)pentane,
2,2,3,4,4,4-Hexafluoro-1-butanol,
2,2,3,3,4,4,5,5-Octafluoro-1-pentanol,
2,2-Bis(trifluoromethyl)-1-propanol,
3,3,4,4,5,5,6,6-Nonafluoro-1-hexanol,
2,3,3,3-Tetrafluoro-2-(perfluoropropyl- oxy)-1-propanol,
4,4,5,5,6,6,7,7,7-Nonafluoro-1-heptanol,
3,3,4,4,5,5,6,6,7,7,8,8,8-Tridecafluoro-1-octanol,
7,7,8,8,8-Pentafluoro-1-octanol,
4,4,5,5,6,6,7,7,8,8,9,9,9-Tridecafluoro-1-nonanol,
7,8,8,8-Tetrafluoro-7-(trifluoromethyl)-1-octanol,
2,3,3,3-Tetrafluoro-2-(1,1,2,3,3,3-hexa-fluoro-2-(perfluoropropyloxy)propyloxy)-1-propanol,
Cyclopentanone, and
Dioxane.

2. The process for producing a charge retention medium according to claim 1, which comprises, after the step (V), a step (VII) of injecting electric charge into the coating film to obtain a charge retention medium.

3. The process for producing a charge retention medium according to claim 1, wherein the fluorinated copolymer (A) is a fluorinated copolymer having reactive functional groups.

4. The process for producing a charge retention medium according to claim 3, wherein the fluorinated copolymer (A) has repeating units based on a monomer having a reactive functional group, and the proportion of the repeating units is from 0.01 to 5 mol % based on all the repeating units (100 mol %).

5. The process for producing a charge retention medium according to claim 3,
wherein the reactive functional groups of the fluorinated copolymer (A) are at least one member selected from the group consisting of carboxylic acid groups, acid anhydride groups and carboxylic acid halide groups.

6. The process for producing a charge retention medium according to claim 1, wherein the proportion of the fluorinated copolymer (A) is from 0.1 to 30 mass % based on the coating composition (100 mass %).

7. The process for producing a charge retention medium according to claim 1, wherein the coating composition contains at least one charge aid (B) selected from the group consisting of a compound having a least one amino group and at least one reactive functional group (excluding an amino group) and a compound having at least two amino groups and having no reactive functional group (excluding an amino group).

8. The process for producing a charge retention medium according to claim 7, wherein the amount of use of the charge aid (B) is from 0.1 to 10 parts by mass based on 100 parts by mass of the fluorinated copolymer (A).

9. The process for producing a charge retention medium according to claim 1, wherein the charge retention medium is an electret.

10. The process of claim 1, wherein the organic solvent (C) is diisopropylketone.

11. The process of claim 1, wherein the organic solvent (C) is selected from the group consisting of:
Methyl ethyl ketone,
2-Pentanone,
Methyl isopropyl ketone,
2-Hexanone,
Methyl isobutyl ketone,
Pinacolin,
2-Heptanone,
4-Heptanone, Diisopropyl ketone,
Isoamyl methyl ketone,
2-Octanone,
2-Nonanone,
Diisobutyl ketone,
2-Decanone,
2-Methylcyclohexanone,
3-Methylcyclohexanone,
4-Ethylcyclohexanone,
2,6-Dimethylcyclohexanone,
3,3,5-Trimethylcyclohexanone,
4-tert-butylcyclohexanone,
Cycloheptanone,
Isophorone,
(-)-Fenchone, and
Cyclopentanone.

12. The process of claim 1, wherein the organic solvent (C) is selected from the group consisting of:
Ethyl formate,
Propyl formate,
Isopropyl formate,
Butyl formate,
Isobutyl formate,
sec-Butyl formate,
t-Butyl formate,
Amyl formate,
Isoamyl formate,
Hexyl formate,
Cyclohexyl formate,
Heptyl formate,
Octyl formate,
2-Ethylhexyl formate,
Nonyl formate,
Methyl acetate,
Propyl acetate,
Isopropyl acetate,
Isobutyl acetate,
sec-Butyl acetate,
t-Butyl acetate,
Amyl acetate,
Isoamyl acetate,
Hexyl acetate,
Cyclohexyl acetate,
Heptyl acetate,
Octyl acetate,
2-Ethylhexyl acetate,
Methyl propionate,
Ethyl propionate,
Propyl propionate,
Isopropyl propionate,
Butyl propionate,
Isobutyl propionate,
sec-Butyl propionate,
t-Butyl propionate,
Amyl propionate,
Isoamyl propionate,
Hexyl propionate,
Cyclohexyl propionate,
Heptyl propionate,
Methyl butyrate,
Ethyl butyrate,
Propyl butyrate,
Isopropyl butyrate,
Butyl butyrate,
Isobutyl butyrate,
sec-Butyl butyrate,
t-Butyl butyrate,
Amyl butyrate,
Isoamyl butyrate,
Hexyl butyrate,
Cyclohexyl butyrate,
Methyl isobutyrate,
Ethyl isobutyrate,
Propyl isobutyrate,
Isopropyl isobutyrate,
Butyl isobutyrate,
Isobutyl isobutyrate,
sec-Butyl isobutyrate,
t-Butyl isohutyrate.
Amyl isobutyrate,
Isoamyl isobutyrate,
Hexyl isobutyrate,
Cyclohexyl isobutyrate,
Methyl valerate,
Ethyl valerate,
Propyl valerate,
Isopropyl valerate,
Butyl valerate,
Isobutyl valerate,
sec-Butyl valerate,
t-Butyl valerate,
Amyl valerate,
Isoamyl valerate,
Methyl isovalerate,
Ethyl isovalerate,
Propyl isovalerate,
Isopropyl isovalerate,
Butyl isovalerat,
Isobutyl isovalerate,
sec-Butyl isovalerate,
t-Butyl isovalerate,
Amyl isovalerate,
Isoamyl isovalerate,
Methyl hexanoate,
Ethyl hexanoate,
Propyl hexanoate,
Isopropyl hexanoate,
Butyl hexanoate,
Isobutyl hexanoate,
sec-Butyl hexanoate,
t-Butyl hexanoate,
Methyl heptanoate,
Ethyl heptanoate,
Propyl heptanoate,
Isopropyl heptanoate,
Methyl octanoate,
Ethyl octanoate,
Methyl nonanoate,
Methyl cyclohexanecarboxylate,
Ethyl cyclohexanecarboxylate,
Propyl cyclohexanecarboxylate,
Isopropyl cyclohexanecarboxylate,
2-Ethoxyethyl acetate,
2-Propoxyethyl acetate,
2-Butoxyethyl acetate,
2-Pentyloxyethyl acetate,
2-Hexyloxyethyl acetate,
1-Methoxy-2-acetoxypropane,
1-Ethoxy-2-acetoxypropane,
1-Propoxy-2-acetoxypropane,
1--Butoxy-2-acetoxypropane,
1-Pentyloxy-2-acetoxypropane,
3-Methoxybutyl acetate,
3-Ethoxybutyl acetate, 3-Propoxybutyl acetate,
3-Butoxybutyl acetate,
3-Methoxy-3-methylbutyl acetate,
3-Ethoxy-3-methylbutyl acetate,
3-Propoxy-3-methylbutyl acetate,
4-Methoxybutyl acetate,
4-Ethoxybutyl acetate,
4-Propoxybutyl acetate,
4-Butoxybutyl acetate, and
2-(Perfluoropropyloxy)-2,3,3,3- tetrafluoropropyl acetate.

13. The process of claim 1, wherein the organic solvent (C) is selected from the group consisting of:
2,2,2- Trifluoroethyl acetate,
2,2,3,3-Tetrafluoropropyl acetate,
2,2,3,3,3-Pentafluoropropyl acetate,
1,1,1,3,3,3-Hexafluoro-2-propyl acetate,
2,2-Bis(trifluoromethyl)propyl acetate,
2,2,3,3,4,4,4-Heptafluorobutyl acetate,
2,2,3,4,4,4-Hexafluorobutyl acetate,
2,2,3,3,4,4,5,5,5-Nonafluoropentyl acetate,
2,2,3,3,4,4,5,5-Octafluoropentyl acetate,
3,3,4,4,5,5,6,6,6-Nonafluorohexyl acetate,
4,4,5,5,6,6,7,7,7-Nonafluoroheptyl acetate,
2,2,3,3,4,4,5,5,6,6,7,7-Dodecafluoroheptyl acetate,
7,7,8,8,8-Pentafluorooctyl acetate,
3,3,4,4,5,5,6,6,7,7,8,8-Tridecafluoro-octyl acetate,
2,2,2-Trifluoroethyl cyclohexane- carboxylate,
Bis(2,2,2-trifluoroethyl) succinate,
Bis(2,2,2-trifluoroethyl) glutarate, and
Bis(2,2,2-trifluoroethyl) adipate.

14. The process of claim 1, wherein the organic solvent (C) is selected from the group consisting of:
Methyl trifluoroacetate,
Ethyl trifluoroacetate,
Propyl trifluoroacetate,
Isopropyl trifluoroacetate,
Butyl trifluoroacetate,
Isobutyl trifluoroacetate,
sec-Butyl trifluoroacetate,
t-Butyl trifluoroacetate,
Amyl trifluoroacetate,
Isoamyl trifluoroacetate,
Heptyl trifluoroacetate,
Cyclohexyl trifluoroacetate,
Heptyl trifluoroacetate,
Octyl trifluoroacetate,
2-Ethythexyl trifluoroacetate,
Methyl difluoroacetate,
Ethyl difluoroacetate,
Methyl perfluoropropionate,
Ethyl perfluoropropionate,
Methyl perfluorobutanoate,
Ethyl perfluorobutanoate,
Methyl perfluoropentanoate,
Ethyl perfluoropentanoate,
Methyl 2,2,3,3,4,4,5,5-octafluoro- pentanoate,
Ethyl 2,2,3,3,4,4,5,5,-octafluoro pentanoate,
Methyl perfluoroheptanoate,
Ethyl perfluoroheptanoate,
Methyl 2,2,3,3,4,4,5,5,6,6,7,7- dodecafluoroheptanoate,
Ethyl 2,2,3,3,4,4,5,5,6,6,7,7- dodecafluoroheptanoate,
Methyl 2-trifluoromethyl-3,3,3- trifluoropropionate, and
Ethyl 2-trifluoromethyl-3,3,3- trifluoropropionate.

15. The process of claim 1, wherein the organic solvent (C) is selected from the group consisting of:
Dimethyl carbonate,
Ethylmethyl carbonate,
Diethyl carbonate,
Dipropyl carbonate,
Dibutyl carbonate,
Bis(2,2,2-trifluoroethyl) carbonate, and
Bis(2,2,3,3-tetrafluoropropyl) carbonate.

16. The process of claim 1, wherein the organic solvent (C) is selected from the group consisting of:
Butyronitrile,
Isobutyronitrile,
Valeronitrile,
Isovaleronitrile,
Capronitrile,
Isocapronitrile,
Heptanenitrile,
Octanenitrile,
Nonanenitrile, and
Decanenitrile.

17. The process of claim 1, wherein the organic solvent (C) is selected from the group consisting of:
5-(Perfluorobutyl)bicyclo[2,2,1]-2-heptene,
5-(Perfluorohexyl)bicyclo[2,2,1]-2- heptane,
5-(Perfluorobutyl)bicyclo[2,2,1 ]heptane,
5-(Perfluorohexyl)bicyclo[2,2,1]heptane,
HFC-c447ef(1,1,2,2,3,3,4- heptafluorocyclopentane), and
1,1,1,2,3,3-Hexafluoro-4-(1,1,2,3,3,3- hexafluoropropoxy)pentane.

18. The process of claim 1, wherein the organic solvent (C) is selected from the group consisting of:
2,2,3,4,4,4-Hexafluoro-1-butanol,
2,2,3,3,4,4,5,5-Octafluoro-1-pentanol,
2,2-Bis(trifluoromethyl)-1-propanol,
3,3,4,4,5,5,6,6-Nonafluoro-1-hexanol,
2,3,3,3-Tetrafluoro-2-(perfluoropropyl- oxy)-1-propanol,
4,4,5,5,6,6,7,7,7-Nonafluoro-1-heptanol,
3,3,4,4,5,5,6,6,7,7,8,8,8-Tridecafluoro-1- octanol,
7,7,8,8,8-Pentafluoro-1-octanol,
4,4,5,5,6,6,7,7,8,8,9,9,9-Tridecafluoro-1- nonanol,
7,8,8,8-Tetrafluoro-7-(trifluoromethyl)-1- octanol, and
2,3,3,3-Tetrafluoro-2-(1,1,2,3,3,3-hexa- fluoro-2-(perfluoropropyloxy)propyloxy)- 1-propanol.

19. The process of claim 1, wherein the organic solvent (C) is selected from the group consisting of:
Tetrahydrofuran, and Dioxane.

20. A process for producing a charge retention medium, which comprises
a step of applying a coating composition containing a fluorinated copolymer (A) having repeating units based on tetrafluoroethylene and repeating units based on ethylene, and an organic solvent (C), to a substrate to form a coating film
and the following steps (I), (II), (IV) and (V) in this order:
(I) a step of dissolving the fluorinated copolymer (A) in the organic solvent (C) at a temperature of at least the dissolution temperature at which the fluorinated copolymer (A) is dissolved in the organic solvent (C) and at most the melting point of the fluorinated copolymer (A) to obtain a fluorinated copolymer solution;
(II) a step of cooling the fluorinated copolymer solution to a temperature of less than the dissolution temperature to obtain the coating composition having microparticles of the fluorinated copolymer (A) dispersed in the organic solvent (C);
(IV) a step of applying the coating composition to the substrate to form a wet film; and (V) a step of preliminarily drying the wet film at a temperature of at least 50° C. and less than 150° C., followed by baking at from 230 to 350° C. to form the coating film, wherein the organic solvent (C) is selected from the group consisting of:

2-pentanone, methyl isopropyl ketone, 2-hexanone, methyl isobutyl ketone, pinacoline, 2-heptanone, 4-heptanone, diisopropyl ketone, isoamyl methyl ketone, 2-octanone, 2-nonanone, diisobutyl ketone, 2-methylcyclohexanone, 3-methylcyclohexanone, 4-ethylcyclohexanone, 2,6-dimethylcyclohexanone, 3,3,5-trimethylcyclohexanone, cycloheptanone, isophorone, (-)-fenchone, propyl formate, isopropyl formate, butyl formate, isobutyl formate, sec-butyl formate, amyl formate, isoamyl formate, hexyl formate, heptyl formate, octyl formate, 2-ethylhexyl formate, propyl acetate, isopropyl acetate, isobutyl acetate, sec-butyl acetate, amyl acetate, isoamyl acetate, hexyl acetate, cyclohexyl acetate, heptyl acetate, 2,2,2-trifluoroethyl acetate, 2,2,3,3-tetrafluoropropyl acetate, 2,2,3,3,3-pentafluoropropyl acetate, 1,1,1,3,3,3-hexafluoro-2-propyl acetate, 2,2-bis(trifluoromethyl)propyl acetate, 2,2,3,3,4,4,4-heptafluorobutyl acetate, 2,2,3,4,4,4-hexafluorobutyl acetate, 2,2,3,3,4,4,5,5,5-nonafluoropentyl acetate, 2,2,3,3,4,4,5,5-octafluoropentyl acetate, 3,3,4,4,5,5,6,6,6-nonafluorohexyl acetate, 4,4,5,5,6,6,7,7,7-nonafluoroheptyl acetate, 2,2,3,3,4,4,5,5,6,6,7,7-dodecafluoroheptyl acetate, methyl propionate, ethyl propionate, propyl propionate, isopropyl propionate, butyl propionate, isobutyl propionate, sec-butyl propionate, t-butyl propionate, amyl propionate, isoamyl propionate, hexyl propionate, cyclohexyl propionate, methyl butyrate, ethyl butyrate, propyl butyrate, isopropyl butyrate, butyl butyrate, isobutyl butyrate, sec-butyl butyrate, t-butyl butyrate, amyl butyrate, isoamyl butyrate, methyl isobutyrate, ethyl isobutyrate, propyl isobutyrate, isopropyl isobutyrate, butyl isobutyrate, isobutyl isobutyrate, sec-butyl isobutyrate, t-butyl isobutyrate, amyl isobutyrate, isoamyl isobutyrate, methyl valerate, ethyl valerate, propyl valerate, isopropyl valerate, butyl valerate, isobutyl valerate, sec-butyl valerate, t-butyl valerate, methyl isovalerate, ethyl isovalerate, propyl isovalerate, isopropyl isovalerate, butyl isovalerate, isobutyl isovalerate, sec-butyl isovalerate, t-butyl isovalerate, methyl hexanoate, ethyl hexanoate, propyl hexanoate, isopropyl hexanoate, methyl heptanoate, ethyl heptanoate, methyl octanoate, methyl cyclohexanecarboxylate, ethyl cyclohexanecarboxylate, 2,2,2-trifluoroethyl cyclohexanecarboxylate, bis(2,2,2-trifluoroethyl) succinate, bis(2,2,2-trifluoroethyl) glutarate, ethyl trifluoroacetate, propyl trifluoroacetate, isopropyl trifluoroacetate, butyl trifluoroacetate, isobutyl trifluoroacetate, sec-butyl trifluoroacetate, t-butyl trifluoroacetate, amyl trifluoroacetate, isoamyl trifluoroacetate, hexyl trifluoroacetate, cyclohexyl trifluoroacetate, heptyl trifluoroacetate, ethyl difluoroacetate, ethyl perfluoropropionate, methyl perfluorobutanoate, ethyl perfluorobutanoate, methyl perfluoropentanoate, ethyl perfluoropentanoate, methyl 2,2,3,3,4,4,5,5-octafluoropentanoate, ethyl 2,2,3,3,4,4,5,5-octafluoropentanoate, methyl perfluoroheptanoate, ethyl perfluoroheptanoate, methyl 2,2,3,3,4,4,5,5,6,6,7,7-dodecafluoroheptanoate, ethyl 2,2,3,3,4,4,5,5,6,6,7,7-dodecafluoroheptanoate, methyl 2-trifluoromethyl-3,3,3-trifluoropropionate, ethyl 2-trifluoromethyl-3,3,3-trifluoropropionate, 2-propxyethyl acetate, 2-butoxyethyl acetate, 2-pentyloxyethyl acetate, 1-methoxy-2-acetoxypropane 1-ethoxy-2-acetoxypropane, 1-propoxy-2-acetoxypropane, 1-butoxy-2-acetoxypropane, 3-methoxybutyl acetate, 3-ethoxybutyl acetate, 3-propoxybutyl acetate, 3-methoxy-3-methylbutyl acetate, 3-ethoxy-3-methylbutyl acetate, 4-methoxybutyl acetate, 4-ethoxybutyl acetate, 4-propoxybutyl acetate, diethyl carbonate, dipropyl carbonate, dibutyl carbonate, bis(2,2,2-trifluoroethyl) carbonate, bis(2,2,3,3-tetrafluoropropyl) carbonate, tetrahydrofuran, butyronitrile, isobutyronitrile, valeronitrile, isovaleronitrile, capronitrile, isocapronitrile, heptanenitrile, octanenitrile, nonanenitrile, 5-(perfluorobutyl)bicyclo[2,2,1]-2-heptene, 5-(perfluorobutyl)bicyclo[2,2,1]heptane, 1,1,2,2,3,3,4-heptafluorocyclopentane, 1,1,1,2,3,3-hexafluoro-4-(1,1,2,3,3,3-hexafluoropropoxy)pentane, 2,2,3,4,4,4-hexafluoro-1-butanol, 2,2,3,3,4,4,5,5-octafluoro-1-pentanol, 2,2-bis(trifluoromethyl)-1-propanol, 3,3,4,4,5,5,6,6,6-nonafluoro-1-hexanol, 2,3,3,3-tetrafluoro-2-(perfluoropropyloxy)-1-propanol, 4,4,5,5,6,6,7,7,7-nonafluoro-1-heptanol, 3,3,4,4,5,5,6,6,7,7,8,8,8-tridecafluoro-1-octanol, 7,7,8,8,8-pentafluoro-1-octanol, 4,4,5,5,6,6,7,7,8,8,9,9,9-tridecafluoro-1-nonanol, and 7,8,8,8-tetrafluoro-7-(trifluoromethyl)-1-octanol.

\* \* \* \* \*